United States Patent
Ishii

(10) Patent No.: US 11,212,784 B2
(45) Date of Patent: Dec. 28, 2021

(54) APPARATUS AND METHOD FOR COMBINED AREA UPDATE AND REQUEST FOR ON-DEMAND SYSTEM INFORMATION IN WIRELESS COMMUNICATIONS

(71) Applicants: SHARP Laboratories of America, Inc., Camas, WA (US); FG Innovation Company Limited, Hong Kong (CN)

(72) Inventor: Atsushi Ishii, Vancouver, WA (US)

(73) Assignees: Sharp Laboratories of America, Inc., Camas, WA (US); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/372,648

(22) Filed: Apr. 2, 2019

(65) Prior Publication Data

US 2019/0306853 A1 Oct. 3, 2019

Related U.S. Application Data

(63) Continuation of application No. PCT/US2019/025269, filed on Apr. 2, 2019.
(Continued)

(51) Int. Cl.
*H04W 72/04* (2009.01)
*H04W 72/12* (2009.01)

(52) U.S. Cl.
CPC ... *H04W 72/0413* (2013.01); *H04W 72/1289* (2013.01)

(58) Field of Classification Search
CPC .................................................. H04W 72/0413
See application file for complete search history.

(56) References Cited

U.S. PATENT DOCUMENTS

2012/0275365 A1 11/2012 Anderson et al.
2015/0181461 A1 6/2015 Kim et al.
(Continued)

OTHER PUBLICATIONS

R2-1801780, 3GPP TSG-RAN WG2#101, OPPO, "Clarifications on Upper Layer Actions Upon RACH Problem for SI Request", Athens, Greece, Feb. 26-Mar. 2, 2018.
(Continued)

*Primary Examiner* — John D Blanton
(74) *Attorney, Agent, or Firm* — Nixon & Vanderhye P.C.

(57) ABSTRACT

The technology disclosed herein concerns, e.g., apparatus, methods, and procedures for generating, transmitting, and processing a combined message that both indicates RAN-based notification area update (RNAU) and a system information request. A user equipment (36-16) which communicates over a radio interface with an access node (22-16) of a radio access network (RAN) comprises receiver circuitry (46), processor circuitry (40), and transmitter circuitry (44). The receiver circuitry (46) is configured to receive first type system information (SI) from the access node (22-16). The first type system information comprises: scheduling information specifying downlink radio resources for second type SI message(s), each of the second type SI message(s) comprising at least one system information block (SIB), and an indication of a delivery mode for each of the second type SI message(s), the delivery mode being either periodic broadcast or on-demand basis. The processor circuitry (40) is configured to generate, in a case that the user equipment is in an inactive state, a request message for both initiating a RAN-based area update (RNAU) procedure and requesting transmission of at least one second type SI message. The transmitter circuitry (44) is configured to transmit the request message.

20 Claims, 21 Drawing Sheets

Related U.S. Application Data

(60) Provisional application No. 62/651,606, filed on Apr. 2, 2018.

(56) References Cited

U.S. PATENT DOCUMENTS

| | | | |
|---|---|---|---|
| 2016/0353473 | A1 | 12/2016 | Chen et al. |
| 2017/0064764 | A1 | 3/2017 | Ke et al. |
| 2017/0251500 | A1 | 8/2017 | Agiwal et al. |
| 2017/0332372 | A1 | 11/2017 | Lee et al. |
| 2017/0367110 | A1 | 12/2017 | Li et al. |
| 2018/0234890 | A1* | 8/2018 | Shih .................. H04W 36/0005 |
| 2018/0270895 | A1 | 9/2018 | Park et al. |
| 2019/0174398 | A1* | 6/2019 | Geng .................. H04W 72/005 |
| 2019/0223094 | A1* | 7/2019 | Ingale ................ H04W 72/042 |
| 2019/0268831 | A1* | 8/2019 | Lee ..................... H04W 48/04 |
| 2019/0349833 | A1* | 11/2019 | Peng ................ H04W 36/0033 |
| 2020/0045617 | A1* | 2/2020 | Wei ...................... H04W 48/12 |
| 2020/0084782 | A1* | 3/2020 | Rune ................... H04W 48/14 |
| 2020/0374942 | A1* | 11/2020 | Sivavakeesar ........ H04W 68/00 |

OTHER PUBLICATIONS

R2-1801791, 3GPP TSG-RAN WG2#101, OPPO, "Discussion on Indication of On-Demand SI in RMSI and TP to TS 38.331", Athens, Greece, Feb. 26-Mar. 2, 2018.

R2-1801795, 3GPP TSG-RAN WG2#101, OPPO, "Discussion on SI request prohibit timer", Athens, Greece, Feb. 26-Mar. 2, 2018.

R2-1801809, 3GPP TSG-RAN WG2#101, Xiaomi, "Remain issues of on-demand SI", Athens, Greece, Feb. 26-Mar. 2, 2018.

R2-1801831, 3GPP TSG-RAN WG2#101, CATT, "Remaining issues of on-demand SI", Athens, Greece, Feb. 26-Mar. 2, 2018.

R2-1801832, 3GPP TSG-RAN WG2#101, CATT, "Necessity of additional indicator for SI message actually being broadcast", Athens, Greece, Feb. 26-Mar. 2, 2018.

R2-1801882, 3GPP TSG-RAN WG2# 101, Samsung, "On Demand SI: Remaining Issues", Athens, Greece, Feb. 26-Mar. 2, 2018.

R2-1801894, 3GPP TSG-RAN WG2#101, ASUSTeK, "Random access procedure for SI request", Athens, Greece, Feb. 26-Mar. 2, 2018.

R2-1801978, 3GPP TSG-RAN WG2#101, Spreadtrum Communication, "Consideration on Remaining Issues of On-Demand SI", Athens, Greece, Feb. 26-Mar. 2, 2018.

R2-1801985, 3GPP TSG-RAN WG2#101, Potevio, "Msg 4 content for SI request", Athens, Greece, Feb. 26-Mar. 2, 2018.

R2-1802035, 3GPP TSG-RAN WG2# 101, ZTE Corporation, Sanechips, "Consideration on the group based SI request scheme", Athens, Greece, Feb. 26-Mar. 2, 2018.

R2-1802036, 3GPP TSG-RAN WG2#101, ZTE, "Upper layer actions for the Random Access problem", Athens, Greece, Feb. 26-Mar. 2, 2018.

R2-1802037, 3GPP TSG-RAN WG2#101, ZTE, "Further consideration on the Msg3 Content", Athens, Greece, Feb. 26-Mar. 2, 2018.

R2-1802092, 3GPP TSG-RAN WG2#101, vivo, "Beam based on demand SI acquisition for idle/inactive UE", Athens, Greece, Feb. 26-Mar. 2, 2018.

R2-1802093, 3GPP TSG-RAN WG2#101, vivo, "Failure Handling for On Demand SI Acquisition Procedure", Athens, Greece, Feb. 26-Mar. 2, 2018.

R2-1802094, 3GPP TSG-RAN WG2#101, vivo, "Remaining issues of on demand SI", Athens, Greece, Feb. 26-Mar. 2, 2018.

R2-1802316, 3GPP TSG-RAN WG2#101, Ericsson, "Open issues on On-demand SI", Athens, Greece, Feb. 26-Mar. 2, 2018.

R2-1802323, 3GPP TSG-RAN WG2#101, Ericsson, "On-demand SI reject procedure", Athens, Greece, Feb. 26-Mar. 2, 2018.

R2-1802326, 3GPP TSG-RAN WG2#101, Ericsson, "On-demand SI in RRC connected", Athens, Greece, Feb. 26-Mar. 2, 2018.

R2-1802457, 3GPP TSG-RAN WG2#101, ETRI, "Efficient broadcast indication mechanism", Athens, Greece, Feb. 26-Mar. 2, 2018.

R2-1802553, 3GPP TSG-RAN WG2#101, ASUSTeK, "Discussion on On-demand system information request in NR", Athens, Greece, Feb. 26-Mar. 2, 2018.

R2-1802735, 3GPP TSG-RAN WG2#101, LG Electronics Inc., "Remaining issues on on-demand SI request procedure", Athens, Greece, Feb. 26-Mar. 2, 2018.

R2-1802821, 3GPP TSG-RAN WG2#101, InterDigital Inc., "MSG3-Based SI Request Procedure", Athens, Greece, Feb. 26-Mar. 2, 2018.

R2-1802822, 3GPP TSG-RAN WG2#101, InterDigital Inc., "On the Need for Additional Indication for On Demand SI", Athens, Greece, Feb. 26-Mar. 2, 2018.

R2-1802960, 3GPP TSG-RAN WG2#101, Intel Corporation, "Remaining issues on On demand System Information", Athens, Greece, Feb. 26-Mar. 2, 2018.

R2-1803126, 3GPP TSG-RAN WG2#101, Sony, "Necessity of indication that on demand SI is being broadcast", Athens, Greece, Feb. 26-Mar. 2, 2018.

R2-1803363, 3GPP TSG-RAN WG2# 101, Huawei, HiSilicon, "Indications for Other SI acquisition", Athens, Greece, Feb. 26-Mar. 2, 2018.

R2-1803364, 3GPP TSG-RAN WG2#101, Huawei, HiSilicon, "MSG3 based other SI acquisition", Athens, Greece, Feb. 26-Mar. 2, 2018.

R2-1803365, 3GPP TSG-RAN WG2#101, Huawei, HiSilicon, "Connected mode SI acquisition", Athens, Greece, Feb. 26-Mar. 2, 2018.

R2-1803366, 3GPP TSG-RAN WG2#101, Huawei, HiSilicon, "Failure handing for on-demand SI acquisition", Athens, Greece, Feb. 26-Mar. 2, 2018.

R2-1803367, 3GPP TSG-RAN WG2#101, Huawei, HiSilicon, "No rejection procedure for OSI request", Athens, Greece, Feb. 26-Mar. 2, 2018.

R2-1803368, 3GPP TSG-RAN WG2#101, Huawei, HiSilicon, RACH Configuration for Msg1 based On-Demand SI Request, Athens, Greece, Feb. 26-Mar. 2, 2018.

R2-1803392, 3GPP TSG-RAN WG2#101, Lenovo, Motorola Mobility, "On demand SI Request remaining FFS", Athens, Greece, Feb. 26-Mar. 2, 2018.

R2-1803645, 3GPP TSG-RAN WG2#101, Nokia, Nokia Shanghai Bell, "Indication for On-Demand SI Broadcast", Athens, Greece, Feb. 26-Mar. 2, 2018.

R2-1803646, 3GPP TSG-RAN WG2#101, Nokia, Nokia Shanghai Bell, "SI Request and Delivery using Msg 3 Approach", Athens, Greece, Feb. 26-Mar. 2, 2018.

R2-1803648, 3GPP TSG-RAN WG2#101, Nokia, Nokia Shanghai Bell, "On-demand SI Delivery for RRC_IDLE/RRC-INACTIVE UEs", Athens, Greece, Feb. 26-Mar. 2, 2018.

R2-1803661, 3GPP TSG-RAN WG2#101, LG Electronics Inc., "SI request in RRC Connected", Athens, Greece, Feb. 26-Mar. 2, 2018.

R2-1803666, 3GPP TSG-RAN WG2#101, Qualcomm Incorporated, "Open issues on NR on-demand SI", Athens, Greece, Feb. 26-Mar. 2, 2018.

R2-1803673, 3GPP TSG-RAN WG2#101, Ericsson, "Duration of on-demand SI broadcast", Athens, Greece, Feb. 26-Mar. 2, 2018.

R2-1801833, 3GPP TSG-RAN WG2#101, CATT, "RAN-based notification area update procedure", Athens, Greece, Feb. 26-Mar. 2, 2018.

R2-1802310, 3GPP TSG-RAN WG2#101, Lenovo, Motorola Mobility, "Anchor gNB relocation in periodic RNAU", Athens, Greece, Feb. 26-Mar. 2, 2018.

R2-1802375, 3GPP TSG-RAN WG2#101, Ericsson, "Context and anchor gNB relocation support in NR Release 15", Athens, Greece, Feb. 26-Mar. 2, 2018.

R2-1802533, 3GPP TSG-RAN WG2#101, LG Electronics Inc., "Timer handling of RAN-based location area update", Athens, Greece, Feb. 26-Mar. 2, 2018.

R2-1802594, 3GPP TSG-RAN WG2# 101, Ericsson, "RNAU Failure clarification", Athens, Greece, Feb. 26-Mar. 2, 2018.

R2-1802794, 3GPP TSG-RAN WG2#101, Huawei, HiSilicon, "On the support of periodical RNA update without context relocation", Athens, Greece, Feb. 26-Mar. 2, 2018.

R2-1802823, 3GPP TSG-RAN WG2#101, InterDigital Inc., "RAN Location Area Update Procedure for NR", Athens, Greece, Feb. 26-Mar. 2, 2018.

(56) References Cited

OTHER PUBLICATIONS

R2-1802935, 3GPP TSG-RAN WG2#101, Intel Corporation, "Periodic RNAU without anchor gNB relocation", Athens, Greece, Feb. 26-Mar. 2, 2018.
R2-1803584, 3GPP TSG-RAN WG2#101, Qualcomm Incorporated, "Periodic RNAU without anchor gNB relocation", Athens, Greece, Feb. 26-Mar. 2, 2018.
R2-1803977, 3GPP TSG-RAN WG2#101, Huawei, "[DRAFT] Reply LS on periodic RNA update without anchor relocation", Athens, Greece, Feb. 26-Mar. 2, 2018.
R2-1804101, 3GPP TSG-RAN WG2#101, RAN2, "Reply LS on periodic RNA update without anchor relocation", Athens, Greece, Feb. 26-Mar. 2, 2018.
R2-1803977, 3GPP TSG-RAN WG2# 101, Huawei, "[DRAFT] Reply on LS on periodic RNA update without anchor relocation", Athens, Greece, Feb. 26-Mar. 2, 2018.
International Search Report and Written Opinion dated Jun. 25, 2019 in PCT Application PCT/2019/025269.

* cited by examiner

Fig. 20A RRCConnectionResumeRequest: ... | resumeIdentity | ... | resumeCause | ... | siRequest | ...

Fig. 20B RRCConnectionResume: ... | nextState | ... | siAck | ... | ran-NotificationAreaInfo | ...

Fig. 22 RRCConnectionResumeReject: ... | nextState | ... | siAck | ... | ran-NotificationAreaInfo | ...

US 11,212,784 B2

APPARATUS AND METHOD FOR COMBINED AREA UPDATE AND REQUEST FOR ON-DEMAND SYSTEM INFORMATION IN WIRELESS COMMUNICATIONS

This application claims priority and benefit of U.S. provisional application 62/651,606, filed Apr. 2, 2018, entitled "APPARATUS AND METHOD FOR COMBINED AREA UPDATE AND REQUEST FOR ON-DEMAND SYSTEM INFORMATION IN WIRELESS COMMUNICATIONS", and is a continuation of PCT patent application PCT/US19/25269, filed Apr. 2, 2019, both of which are incorporated herein by reference in their entirety.

TECHNICAL FIELD

The technology relates to wireless communications, and particularly to methods, apparatus, and techniques for requesting, transmitting, updating, and using system information (SI) in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on the radio channels certain information which is required for mobile stations to access to the network. In Long-Term Evolution (LTE) and LTE Advanced (LTE-A), such information is called "system information" ("SI"). Each access node, such as an evolved NodeB ("eNB") or a gNB in the 5G New Radio (NR) System, broadcasts such system information to its coverage area via a Master Information Block (MIB) and several System Information Blocks (SIBs) on downlink radio resources allocated to the access node.

A wireless terminal ("UE"), after entering a coverage area of an eNB or gNB, is required to obtain all the MIB/SIBs which are necessary to access to the system. For sake of UEs under coverage, the eNB or gNB periodically broadcasts all MIB/SIBs relevant for offered services, where each type of MIB or SIBs is transmitted in a designated radio resource(s) with its own pre-determined/configurable frequency.

This all-broadcast-based periodic delivery method (e.g., collective broadcast of all SIBs, not just those necessary for system access) is efficient under a condition where many UEs are almost always flowing into the coverage area (such as a macro cell). However, this approach may result in wasting valuable radio resources in case of small cell deployment. Therefore, more efficient methods of SIB transmission are desired.

What is needed, therefore, and an example object of the technology disclosed herein, are methods, apparatus, and techniques for more efficient transmission of system information blocks (SIBs).

SUMMARY

In one of its example aspects the technology disclosed herein concerns a wireless terminal which communicates over a radio interface with an access node of a radio access network (RAN). In an example basic embodiment the wireless terminal comprises receiver circuitry, processor circuitry, and transmitter circuitry. The receiver circuitry is configured to receive first type system information (SI) from the access node. The first type system information comprises: scheduling information specifying downlink radio resources for second type SI message(s), each of the second type SI message(s) comprising at least one system information block (SIB); and, an indication of a delivery mode for each of the second type SI message(s), the delivery mode being either periodic broadcast or on-demand basis. The processor circuitry is configured to generate, in a case that the user equipment is in an inactive state, a request message for both initiating a RAN-based area update (RNAU) procedure and requesting transmission of at least one second type SI message. The transmitter circuitry is configured to transmit the request message.

In another of its example aspects the technology disclosed herein concerns a method in a wireless terminal which communicates over a radio interface with an access node of a radio access network (RAN). In an example basic mode the method comprises: receiving first type system information (SI) from the access node; using processor circuitry, when the user equipment is in an inactive state, to generate a request message for both initiating a RAN-based area update (RNAU) procedure and requesting transmission of at least one second type SI message; and transmitting the request message.

In yet another of its example aspects the technology disclosed herein concerns an access node of a radio access network (RAN) that communicates over a radio interface with a wireless terminal or user equipment. In an example basic embodiment the access node comprises receiver circuitry, processor circuitry, and transmitter circuitry. The transmitter circuitry is configured to transmit first type system information (SI). The receiver circuitry is configured to receive a message for both initiating a RAN-based area update (RNAU) procedure and requesting transmission of at least one of the second type SI message(s). The processor circuitry is configured to generate at least one of the requested second type SI message(s). The transmitter circuitry is further configured to transmit the at least one of the requested SI messages. The request message is received in a case that the user equipment is in an inactive state.

In yet another of its example aspects the technology disclosed herein concerns a method in an access node of a radio access network (RAN) that communicates over a radio interface with a wireless terminal or user equipment. In an example basic mode the method comprises: transmitting first type system information (SI); receiving a request message for both initiating a RAN-based area update (RNAU) procedure and requesting transmission of at least one of the second type SI message(s); generating at least one of the requested second type SI message(s); and transmitting the at least one of the requested SI messages. The request message is received in a case that the user equipment is in an inactive state.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 20A and FIG. 20B are diagrammatic views showing, e.g., example formats of RRCConnectionResumeRequest and RRCConnectionResume messages.

FIG. 22 is a diagrammatic view showing, e.g., example format of a RRCConnectionResumeReject message.

DETAILED DESCRIPTION

Figure 1:
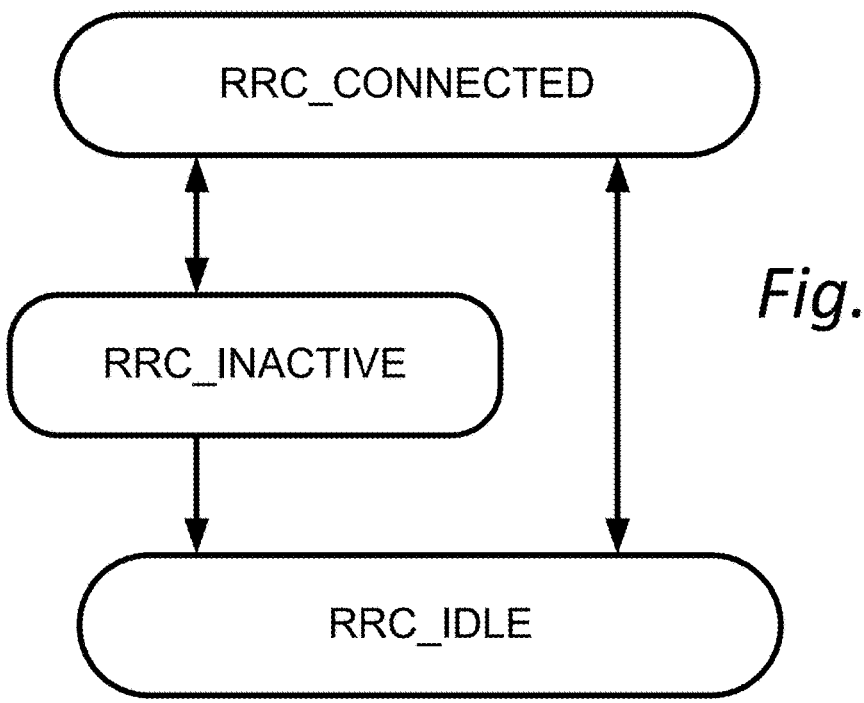
FIG. 1 is a diagrammatic view showing transition states of a Radio Resource Control RRC state machine.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a 5G (New Radio [NR]) gNB, or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, or higher), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IM-TAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As used herein, "system information" ("SI") may include a Master Information Block (MIB) and several System Information Blocks (SIBs) which are provided on downlink radio resources allocated to a access node. The system information may be broadcast, and some types of system information may be provided on demand, e.g., upon receipt of a request for system information from a wireless terminal.

In various aspects of the technology disclosed herein, system information is classified into plural categories or types. In an example embodiment and mode, a first type of the system information is Minimum System Information (Minimum SI), minimally containing information required for UEs initially access to the network, periodically broadcasted by each access node (e.g. eNB for LTE, gNB for 5G Radio System). In some configurations, Minimum System SI may consist of MIB and a limited number of SIBs. The Minimum SI may be also referred as "essential SI", or first type system information.

A second type of system information, e.g., "Other system information", "Other SI", or "second type system information" contains all the other types of information, i.e., all types of system information except the Minimum System Information. The Other SI may comprise several system information blocks (SIBs) that are not categorized as Minimum SI. The Other SI may be also referred as "non-essential SI". However, the second type system information is not to be confused with SIB Type 2, which is a particular (second) system information block (SIB) that may be included in the Minimum System Information or may be a part of the Other SI.

In some example embodiment and modes described herein, the SIBs belonging to Other SI may be organized into one or more groups, and the transmission of the SIBs may be carried by group-basis. As such, one group of SIBs to be transmitted may be contained in a protocol container referred herein as a SI message. The access node may choose to broadcast some of the SI messages periodically, similar to the SIBs in Minimum SI. Alternatively, the access node may choose to refrain from transmitting the other SI messages until receiving a request of on-demand delivery from a UE. In this case, the access node may advertise the availability of on-demand delivery using Minimum SI.

As described herein, both an access node and a wireless terminal may manage respective Radio Resource Control (RRC) state machines. The RRC state machines transition between several RRC states including RRC_IDLE, RRC_INACTIVE and RRC_CONNECTED. FIG. 1 depicts the state transition diagram of the RRC states. From the vantage point of a wireless terminal e.g., user equipment (UE), the RRC states may be briefly characterized as follows:

RRC_IDLE:
    A UE specific DRX (discontinuous reception) may be configured by upper layers;
    UE controlled mobility based on network configuration;
    The UE:
        Monitors a Paging channel;
        Performs neighboring cell measurements and cell (re-) selection;
        Acquires system information.

RRC_INACTIVE:
    A UE specific DRX may be configured by upper layers or by RRC layer;
    UE controlled mobility based on network configuration;
    The UE stores the Access Stratum (AS) context;
    The UE:
        Monitors a Paging channel;
        Performs neighboring cell measurements and cell (re-) selection;
        Performs RAN-based notification area updates when moving outside the RAN-based notification area;
        Acquires system information.

RRC_CONNECTED:
    The UE stores the AS context.
    Transfer of unicast data to/from UE.
    At lower layers, the UE may be configured with a UE specific DRX;
    Network controlled mobility, i.e. handover within NR and to/from E-UTRAN;
    The UE:
        Monitors a Paging channel;
        Monitors control channels associated with the shared data channel to determine if data is scheduled for it;
        Provides channel quality and feedback information;
        Performs neighboring cell measurements and measurement reporting;
        Acquires system information.

The technology disclosed herein concerns, e.g., apparatus, methods, and procedures for obtaining and/or updating SIBs in/of Other SI (Other SI SIBs) in an on-demand basis.

Figure 2:
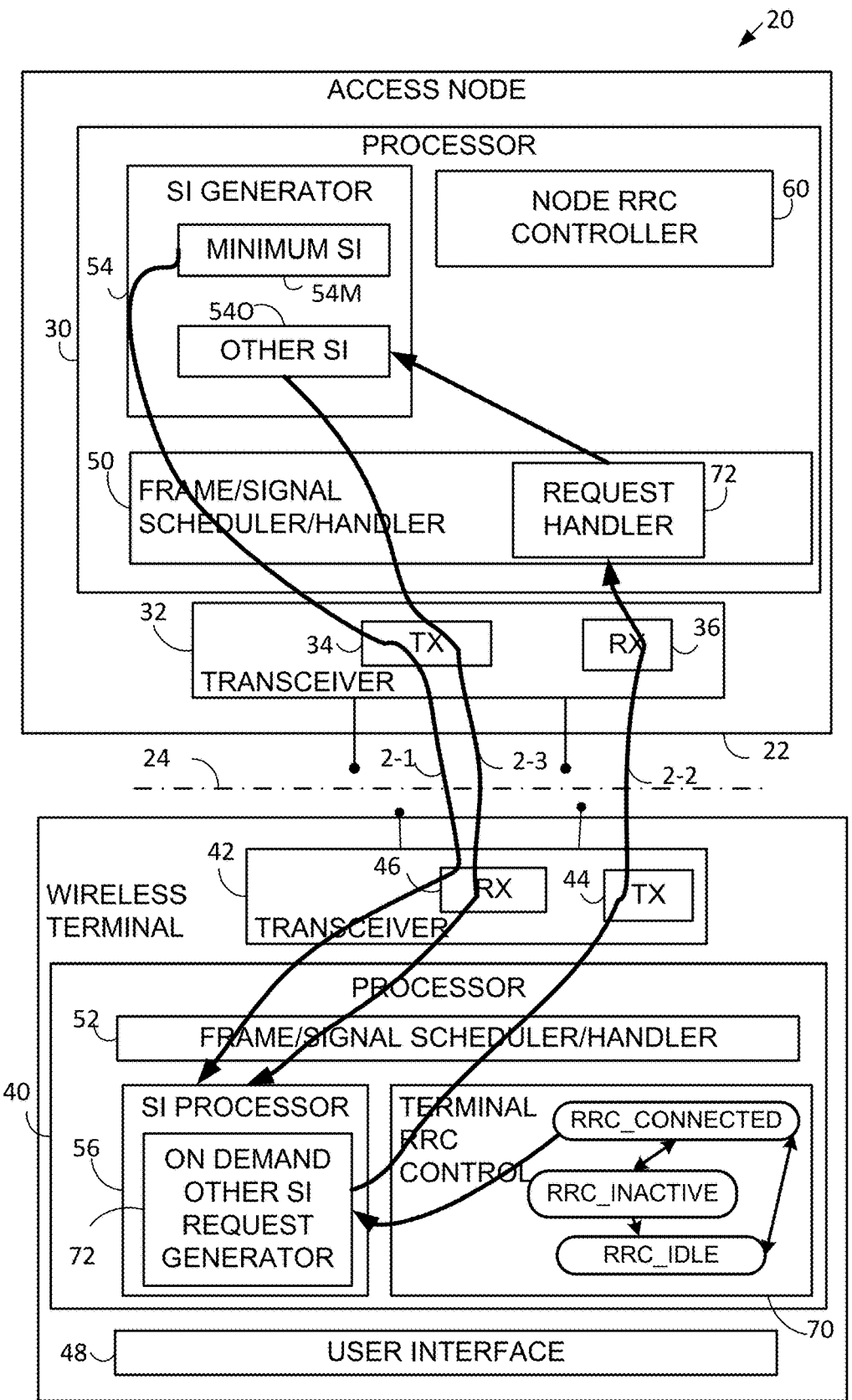
FIG. 2 is a schematic view showing an example generic communications system comprising a radio access node and a wireless terminal, wherein the wireless terminal requests, and the radio access node provides, Other system information (Other SI) when the wireless terminal is in an RRC_CONNECTED state.

FIG. 2 shows an example communications system 20 wherein radio access node 22 communicates over air or radio interface 24 (e.g., Uu interface) with wireless terminal 26. As mentioned above, the radio access node 22 may be any suitable node for communicating with the wireless terminal 26, such as a base station node, or eNodeB ("eNB") or gNB, for example. The node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s). The transmitter circuit 34 and transmitter circuit 44 may comprise, e.g., amplifier(s), modulation circuitry and other conventional transmission equipment. The receiver circuit 36 and receiver circuit 46 may comprise, e.g., e.g., amplifiers, demodulation circuitry, and other conventional receiver equipment.

In general operation, access node, 22 and wireless terminal 26 communicate with each other across radio interface 24 using predefined configurations of information. By way of non-limiting example, the radio access node 22 and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between radio access node 22 and wireless terminal 26 over radio interface 24, the node processor 30 and terminal processor 40 of FIG. 2 are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52.

The node processor 30 of radio access node 22 also includes system information (SI) generator 54. As described above, at least some of the system information generated and provided by the system information (SI) generator 54 is Minimum System Information (Minimum SI), also known as first type system information, represented by Minimum SI handler 54M. Some of the system information may be Other system information (Other SI), also known as second type system information, represented by Other SI handler 54O in FIG. 2. The wireless terminal 26 uses the system information (SI) generated by radio access node 22. Some of the Minimum SI may inform the wireless terminal 26 of the availability of the Other IS.

FIG. 2 illustrates a generic message 2-1 by which the node radio resource controller 54 may supply the Minimal SI to wireless terminal 26. In some example implementations, upon knowing of the availability of the Other SI, due to the message 2-1, for example, the wireless terminal 26 specifically requests the Other system information, in on-demand fashion, as described herein. The terminal processor 40 of wireless terminal 26 comprises, e.g., SI processor 56, to facilitate obtaining and use of system information.

The technology disclosed herein concerns, e.g., apparatus, methods, and procedures for obtaining and/or updating system information blocks (SIBs) in/of the Other SI (Other SI SIBs) in on-demand basis. Since in at least some of the example embodiments and modes the technology disclosed herein involves the Radio Resource Control (RRC) procedures, FIG. 2 shows terminal processor 40 as comprising node radio resource control (RRC) controller 60, e.g., node RRC controller 60. The node RRC controller 60 may execute an instance of the RRC state machine for each wireless terminal in which the access node 20 is in communication, with each instance keeping track of the RRC state transitions experienced by the wireless terminal associated with the respective instance.

FIG. 2 also shows the terminal processor 40 of wireless terminal 26 as comprising, in addition to terminal SI processor 56, a terminal RRC controller 70. The terminal RRC controller 70 includes or executes the RRC state machine discussed above, which transitions through the RRC states, as described above and shown in FIG. 2, for a communication involving wireless terminal 26.

FIG. 2 thus shows that the access node 22 comprises node processor 30, e.g., node processor circuitry 30, transmitter circuit 34, and, receiver circuit 36. The transmitter circuit 34 is configured to transmit the first type system information over a radio interface, the first type system information including availability of a SI message belonging to the second type system information. The receiver circuit 36 is configured to receive from the wireless terminal a request message to request delivery of the SI message which is available by on-demand basis. The transmitter circuit 34 is further configured to transmit the SI message to the wireless terminal.

FIG. 2 thus shows that the wireless terminal 26 communicates over radio interface 24 with access nodes, such as access node 22, of a radio access network (RAN). The wireless terminal 26 comprises receiver circuit 46, transmitter circuit 44, and terminal processor 40, e.g., terminal processor circuitry. The receiver circuit 46 is configured to receive first type system information over the radio interface. The terminal processor circuitry is configured to generate a request message to request the second type SIB which is available in an on-demand basis. The transmitter circuit 44 is configured to transmit the request message over the radio interface while in the connected state. The receiver circuit 46 is also configured to receive the SI message while in the connected state.

Figure 3:
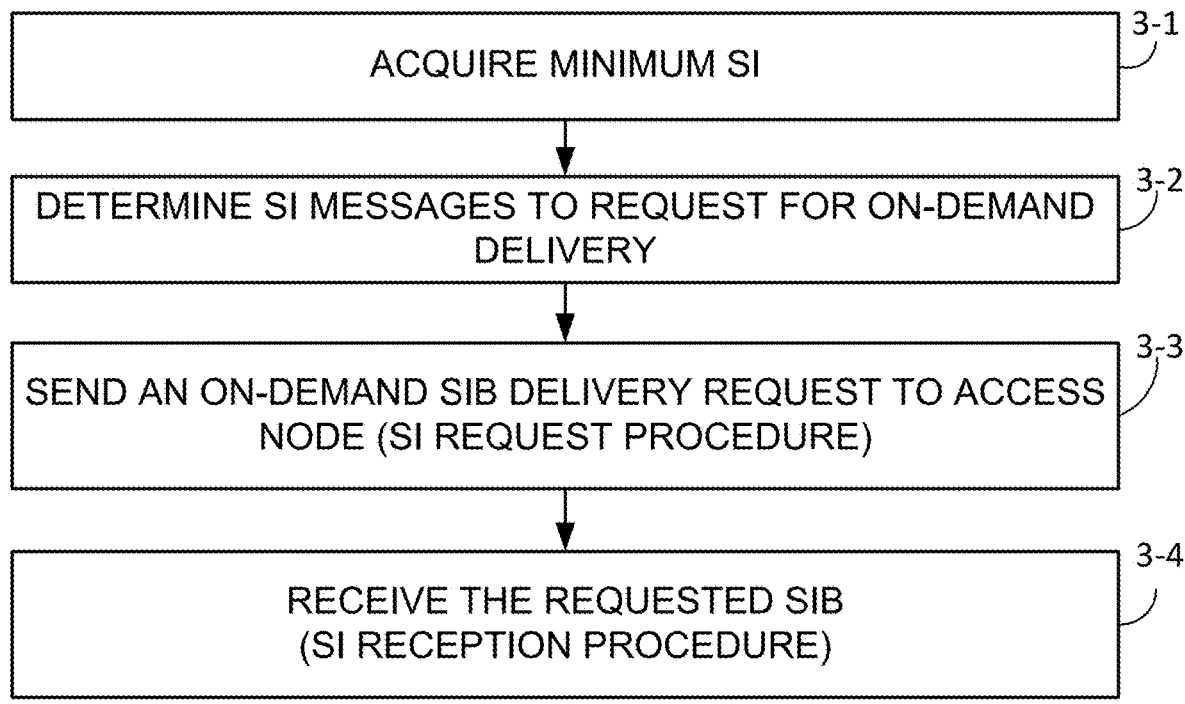
FIG. 3 is a flowchart showing example, basic example acts or steps performed by a wireless terminal of the example generic communications system of FIG. 2.

FIG. 3 shows example, representative acts or steps performed in conjunction with a generic method of operating a wireless terminal of a radio access network (RAN), such as wireless terminal 26 of FIG. 2. Act 3-1 comprises the wireless terminal acquiring, e.g., receiving, the Minimum SI that is broadcasted from the currently serving access node, e.g., access node 22. The Minimum SI may be broadcast in a message such as message 2-1 of FIG. 2. The Minimum SI may contain information about the Other SI, including the delivery method, e.g., periodic broadcast/on-demand, scheduling information, validity information, etc. Based on the information, the wireless terminal in act 3-2 may determine which SI message(s) to acquire by on-demand. As act 3-3, the wireless terminal may send a request message (depicted as message 2-2 of FIG. 2) to the access node, the request message indicating the SI message(s) that the wireless terminal desires to obtain. As act 3-4 the wireless terminal 26 may attempt to receive the requested SI message(s) which, e.g., was sent using message 2-3 of FIG. 2.

It was mentioned above that the first type system information includes availability of a SI message belonging to the second type system information, that the request message requests delivery of a SI message which is available by on-demand basis, and that the SI message is transmitted to the wireless terminal. It should be understood that reference herein to "a SI message belonging to the second type system information" means one or more pieces of Other system information (Other SI), e.g., one or more SI messages belonging to the second type system information. In some example situations indeed only one SI message may be advertised as available and accordingly periodically broadcasted or requested on-demand. But in other example situations plural SI messages (e.g., plural pieces of Other SI) are advertised as available, some of which may be periodically broadcasted and the others may be requested on-demand.

Figure 4:
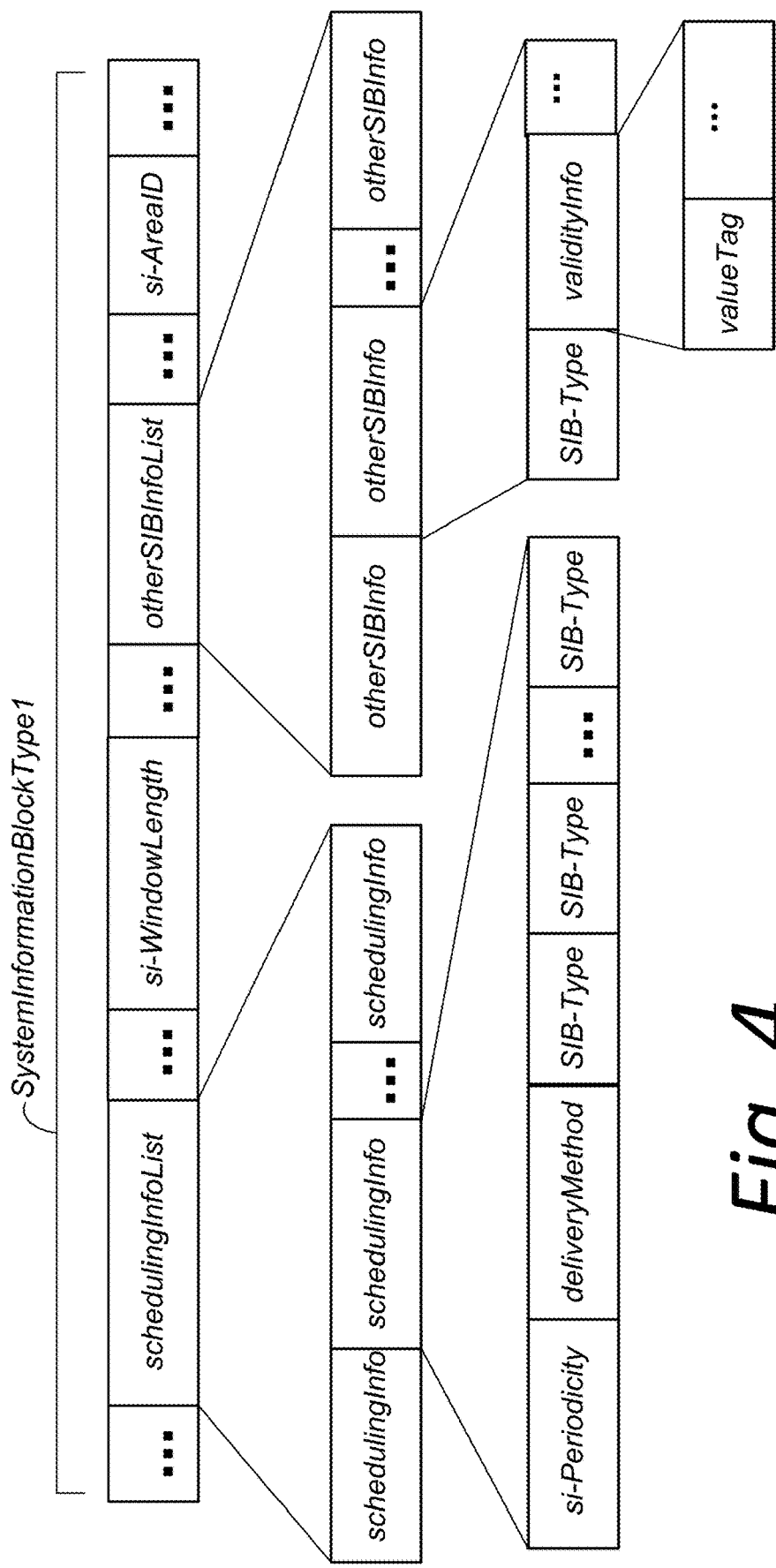
FIG. 4-FIG. 6 are diagrammatic views illustrating differing example formats of a system information block (SIB) which comprises Minimal SI and which carries availability of Other system information (Other SI).

In some configurations, the availability and delivery method information for Other SI SIBs may be included in SIB Type 1, one of the SIBs in the Minimum SI. FIG. 4 shows an example format of SIB Type 1, including schedulingInfoList, si-WindowLength, otherSIBInfoList, validity area identification (si-AreaID), and possibly other configuration parameters. The otherSIBInfoList is a list of otherSIBInfo, which comprises SIB-Type, an identifier of a SIB, validityInfo and validity information of the SIB (a value tag [valueTag], and other parameters, such as validity timer, etc.).

SIBs other than SIB1 are carried in SystemInformation (SI) messages and mapping of SIBS to SI messages is flexibly configurable by schedulingInfoList included in SIB1, with restrictions that: each SIB is contained only in a single SI message, only SIBs having the same scheduling requirement (periodicity given by si-periodicity) can be mapped to the same SI message. There may be multiple SI messages transmitted with the same periodicity.

In one configuration, each element, schedulingInfo, of schedulingInfoList may represent one SI message, comprising its periodicity (si-Periodicity), delivery method (deliveryMethod) indicating if this SIB is periodically broadcasted or to be transmitted upon request (on-demand), and associated SIB types (one or more SIB-Type's). The actual broadcast opportunity, e.g., timing/resources, of a given SI message may be determined by a pre-determined or a network-configured formula as a function of at least the corresponding periodicity. At each opportunity the broadcast of the SI message may occur within the duration of the window length (si-WindowLength). Hereafter a broadcast opportunity is also referred as a SI window. More than one SIB may be possibly transmitted on a same SI window.

Figure 5:
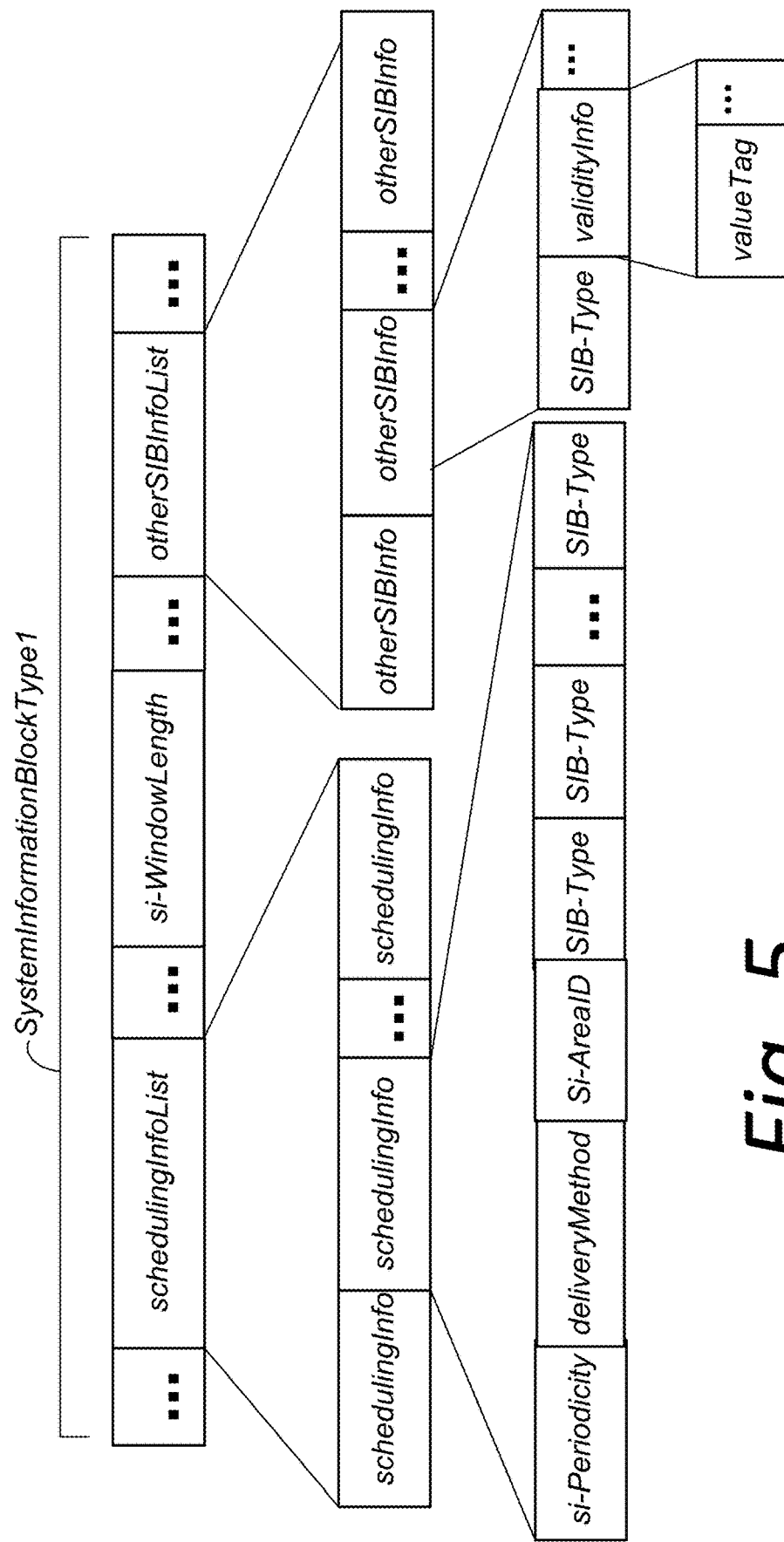
Figure 6:
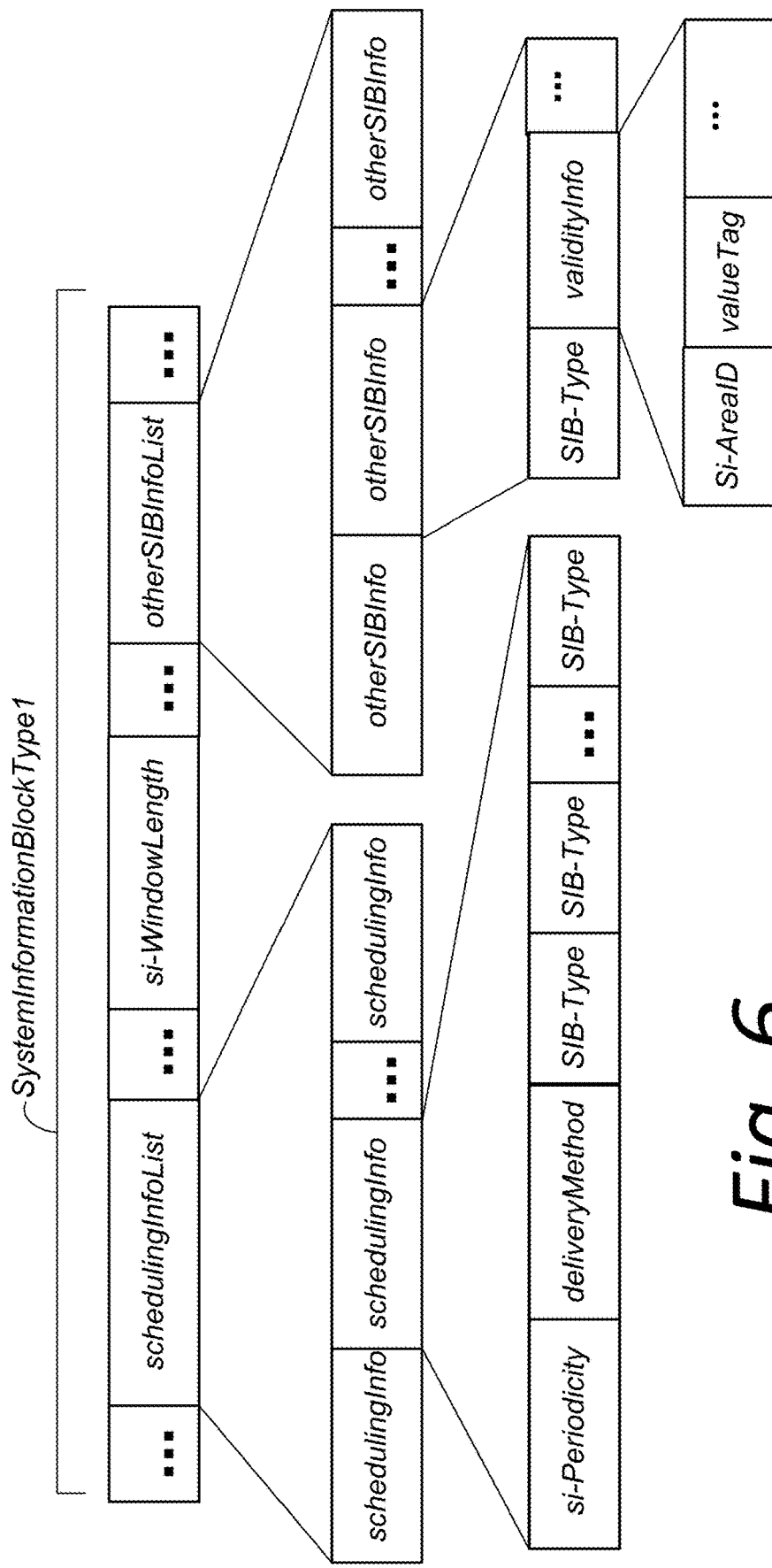

In the configuration of FIG. 4 si-AreaID is common for all SI messages or SIB types, which means that all SIBs have the same validity area. Alternatively, in another configuration, each SI message may have a designated validity area. FIG. 5 shows an example format of SIB1 for such a configuration wherein each SI message may have a designated validity area. Furthermore, in another configuration, having an example format such as shown in FIG. 6, each SIB type may have a designated validity area. Thus, in differing implementations, the system information (SI) generator 54 of FIG. 2, working with node frame/signal scheduler/handler 50, generates the differing formatted SI messages of FIG. 4, FIG. 5, and FIG. 6, for transmission by node transmitter circuitry 34 over radio interface 24.

Figure 7:
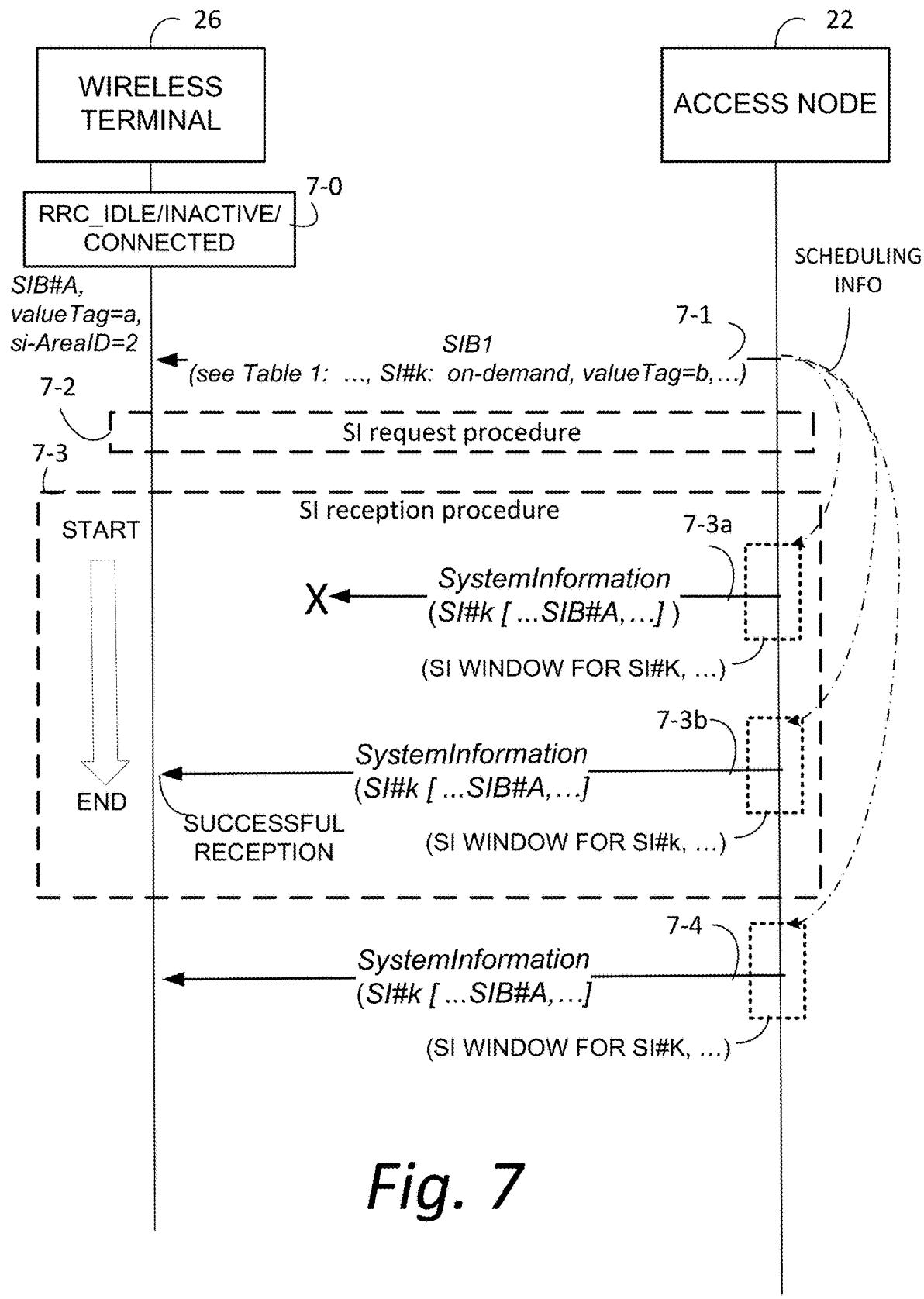
FIG. 7 is a diagrammatic view illustrating an exemplary message flow of on-demand based SI acquisition procedure.

FIG. 7 is an exemplary message flow diagram of on-demand based SI acquisition procedure. As shown by act 7-0, wireless terminal 26 in either RRC_IDLE, RRC_INACTIVE or RRC_CONNECTED state stores the content of SIB#A with the validity information, valueTag=a, si-AreaID=2, which the wireless terminal has previously received. From the currently serving access node, as act 7-1 the wireless terminal may obtain SIB1 as Minimum SI. As shown in FIG. 4, FIG. 5, and FIG. 6, the SIB1 includes the scheduleInfoList, which in turn may include one or more schedulingInfo information elements. An example scheduleInfoList for this scenario is shown in Table 1, wherein the k'th schedulingInfo indicates that the SI message associated with this schedulingInfo (SI#k, hereafter), containing SIB#A, will be available by on-demand delivery. Furthermore, the otherSIBInfo corresponding to SIB#A indicates that the validity information of SIB#A is valueTag=b, si-AreaID=3. It is assumed hereafter that whenever the wireless terminal receives SIB1, it has already received MIB beforehand.

TABLE 1

```
...
schedulingInfoList {
    ...
    k'th schdulingInfo (SI#k) {
        ...
        deliveryMethod = on-demand
        SIB-type = A
        ...
    }
    ...
}
...
otherSIBInfoList {
    ...
    otherISBInfo {
        SIB-type = A
        ValidityInfo {
            valueTag = b
            ...
        }
        ...
    }
    ...
}
...
si-AreaID = 3
...
```

Knowing that the stored SIB#A is now invalid, the wireless terminal may decide to obtain a valid version of SIB#A, and may initiate the SI request procedure represented by act 7-2 and explained herein. After the SI request procedure has a successful result, the wireless terminal may start the SI reception procedure, shown generally as act 7-3 in FIG. 7. In the SI reception procedure the wireless terminal monitors signals from the access node in the designated SI windows derived from the scheduling information (scheduleInfo) in the SIB1, and thereby attempt to receive the requested SI#k. The SI windows are shown by dotted rectangles in FIG. 7. FIG. 7 shows by act 7-3a a first transmission of the requested SI#k, which is unsuccessful, and by act 7-3b a second transmission of the requested SI#k, which is successful. A tail of a vertical down-pointing arrow in the SI reception procedure depiction of FIG. 7 is associated with start of the SI reception procedure, while the head of the same vertical down-pointing arrow is associated with end of the SI reception procedure (at successful reception of the SI#k). FIG. 7 also shows by act 7-4 that other transmissions of the requested system information may also be made even after the wireless terminal has successfully received the sought SI#k.

In one configuration, the wireless terminal may use a counter, which is incremented at every SI window of a particular SI message, e.g. SI#k. In this configuration, the SI reception procedure may end when the requested SI message(s) are successfully received, or when the counter reaches a maximum counter value. In another configuration the wireless terminal starts a timer at the beginning of the SI reception procedure. In this configuration, the SI reception procedure may end when the requested SI message(s) are successfully received, or when the timer expires. The maximum counter value, or the timer value, which may be common for all SI messages or per-SI message basis, may be pre-configured or configured by network via system information. The conditions for the wireless terminal to end the SI reception process is referred as "termination conditions" herein.

Figure 8A:
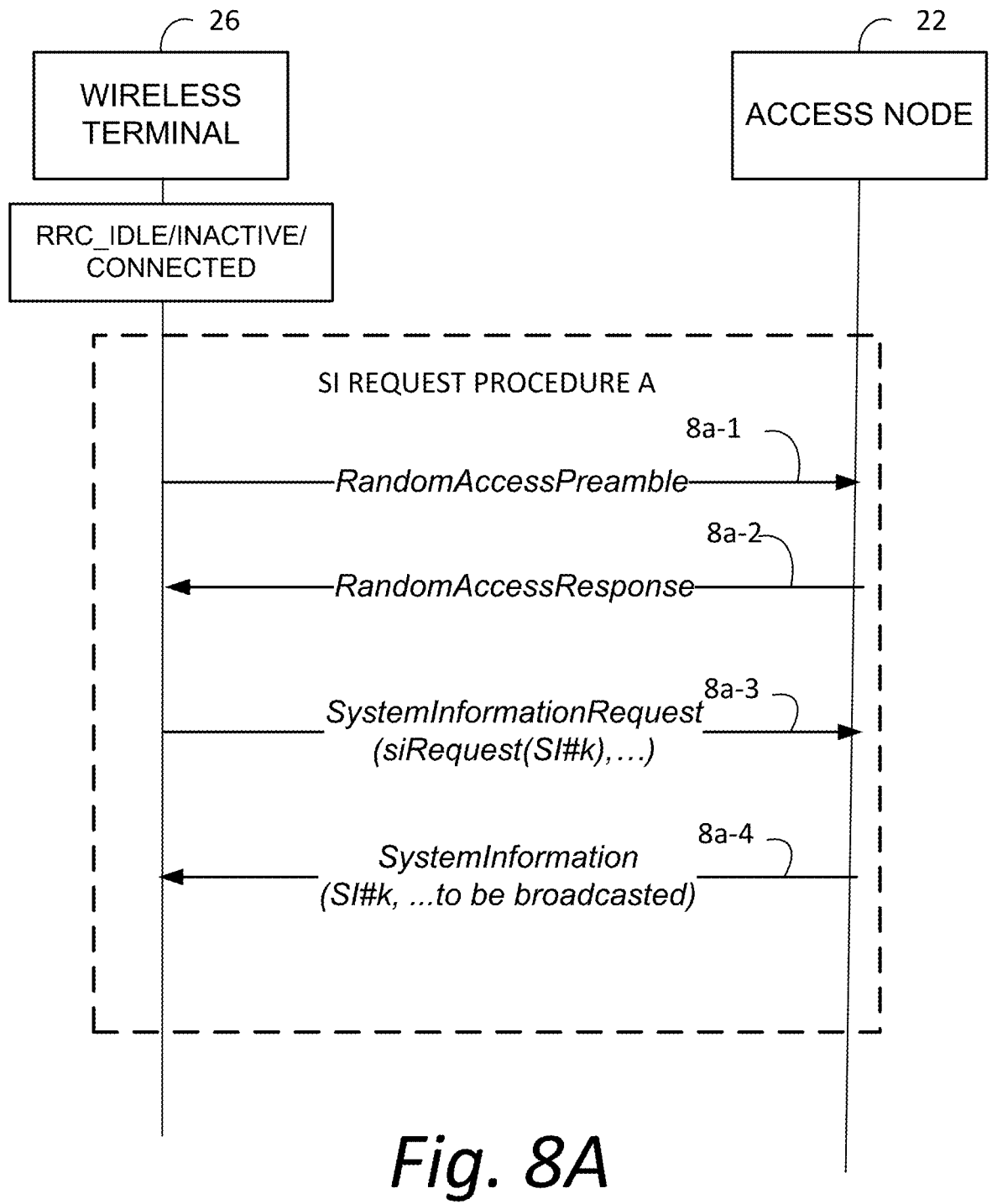
FIGS. 8A, 8B and 8C are diagrammatic views illustrating three options for an SI request procedure.
Figure 8B:
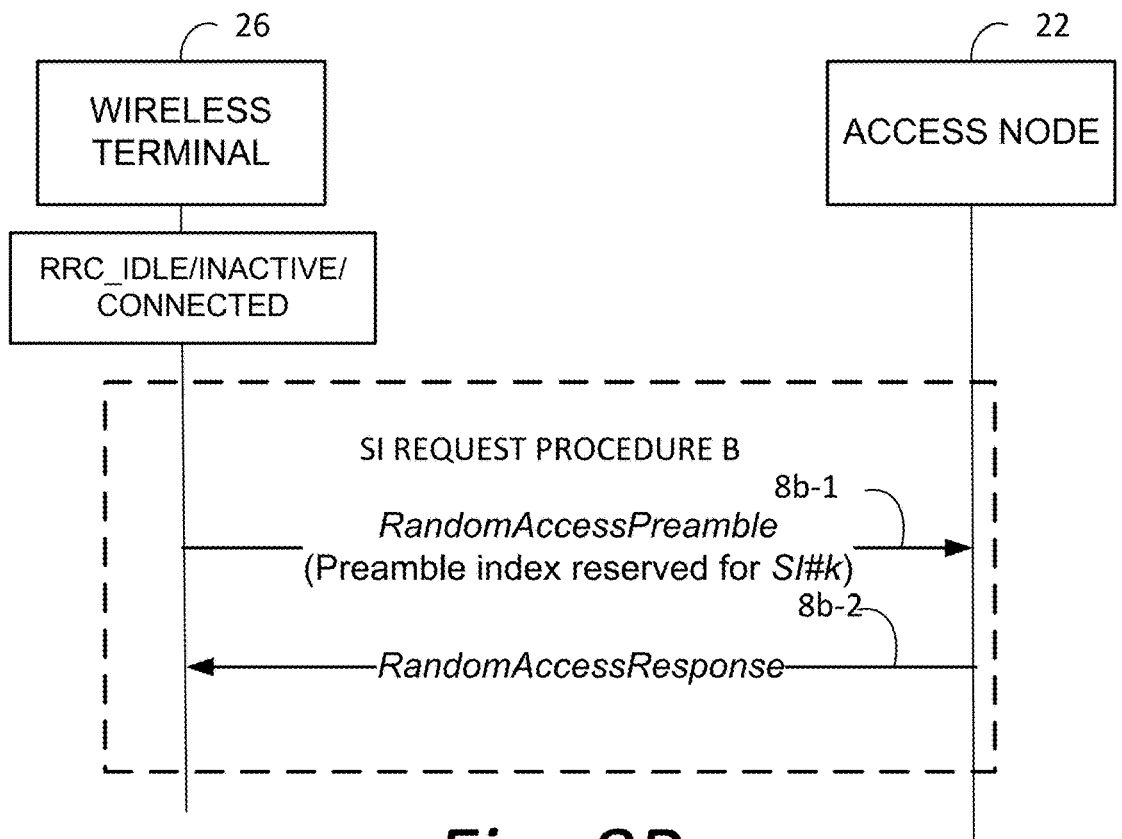
Figure 8C:
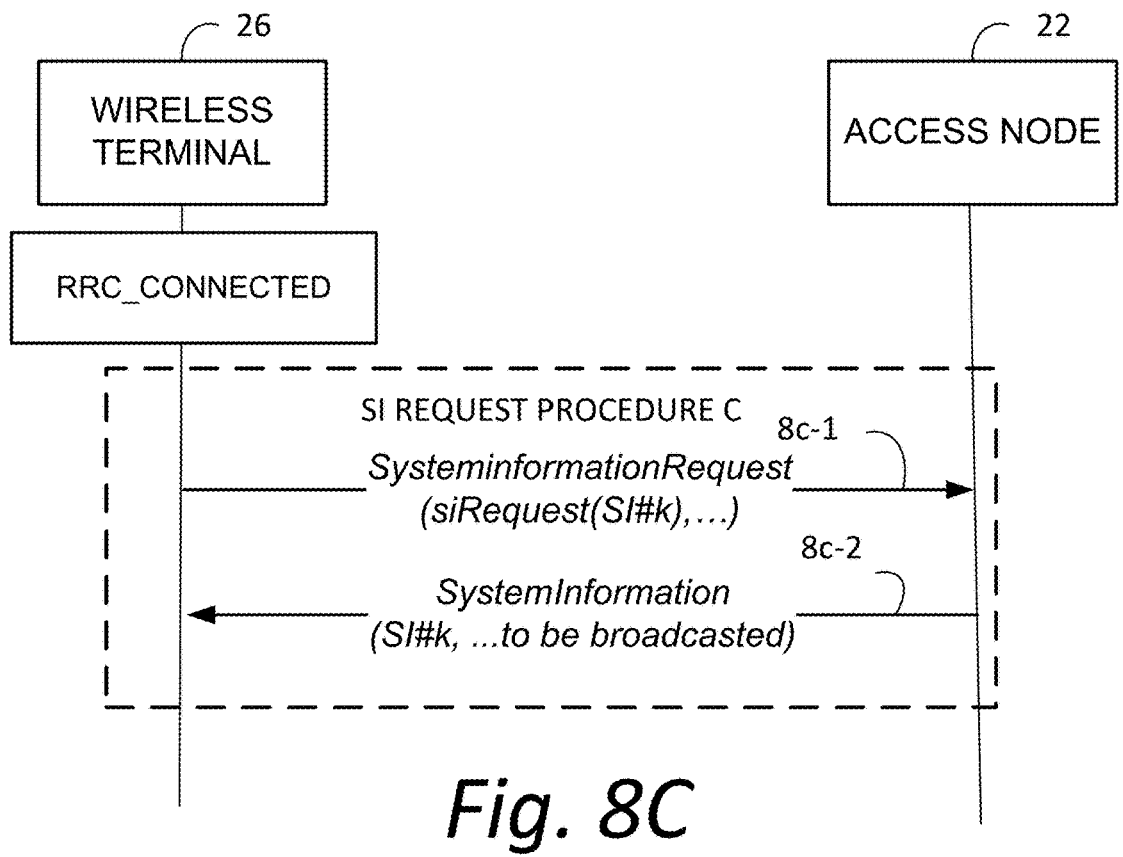

FIGS. 8A, 8B and 8C show three options for the SI request procedure. In FIG. 8A, which may be applicable to wireless terminals in any of the RRC states, the request of on-demand delivery for SI messages may be accomplished by sending a Random Access Preamble, which may comprise a sequence selected from a set of available sequences configured by the access node via Minimum SI. A given sequence is identified by a Preamble Index. When the access node detects the transmission of a preamble sequence, it may respond to it with Random Access Response, which includes the Preamble Index corresponding to the sequence. Upon receiving, the wireless terminal may validate that the Preamble index in the Random Access Response matches the one associated with the preamble sequence, and then send to the access node SystemInformationRequest message that includes the identity of the SI messages (e.g. SI#k) that the wireless terminal desires to receive. In response, the access node may send a SystemInformation message acknowledging the request, indicating that the requested SI message(s) will be broadcasted from the next SI window scheduled for the requested SI message(s).

In one configuration, the access node may include in Minimum SI a set of Preamble indices, each of which is designated for requesting on-demand delivery of one or more specific SI messages. FIG. 8B illustrates an example S request procedure using this configuration, where the wireless terminal in any RRC state may transmit Random Access Preamble sequence given by the Preamble Index associated with the SI message(s) that the wireless terminal has selected. When the wireless terminal receives Random Access Response including the Preamble Index, it may consider that the request procedure is successful.

The SI request procedure in FIG. 8C may be applicable to wireless terminals in RRC_CONNECTED, wherein the SystemInformationRequest message is sent without the random access preamble/response.

In any of the three options disclosed above, the wireless terminal may proceed to the SI reception procedure if the SI request procedure is successful. Otherwise, the wireless terminal may think that the serving cell (controlled by the access node) is barred, which will invoke a cell reselection.

Figure 9:
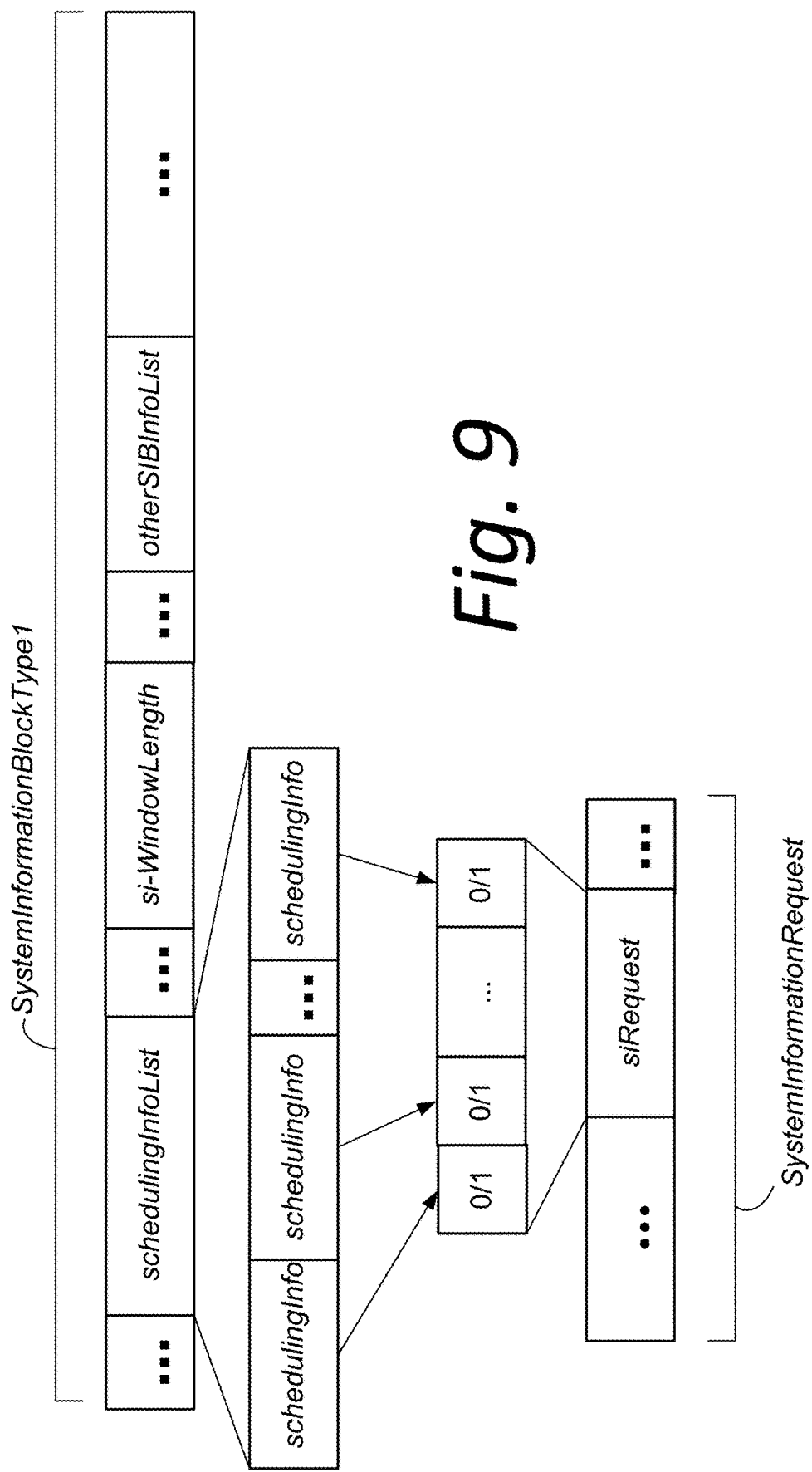
FIG. 9 is a diagrammatic view showing, e.g., a SystemInformationRequest message wherein a siRequest information element comprises a bit map.

The SystemInformationRequest message shown in FIG. 8A or 8C may include an information element (e.g. siRequest) to indicate which SI message(s) that the wireless terminal desires to receive. In one configuration, as shown in FIG. 9, the siRequest may comprise a bit map, wherein each bit corresponds to a schedulingInfo information element in SIB1 of the current serving cell, the bits arranged in the order of schedulingInfo information elements. By doing so, each bit of the bit map may correspond to a specific SI message. Alternatively, siRequest may carry a field indicating that the wireless terminal desires to receive at least one on-demand basis SI message. In this case, the access node may start broadcast all of the on-demand basis SI messages for a pre-configured duration. The SystemInformation message shown in FIG. 8A or 8C may include siAck, an information element for acknowledging siRequest. In one configuration, siAck may comprises the same bit map as the one in SystemInformationRequest, indicating the SI message(s) to be broadcasted. Alternatively, siAck may comprise one Boolean field, indicating whether the request has been accepted or not.

Figure 10:
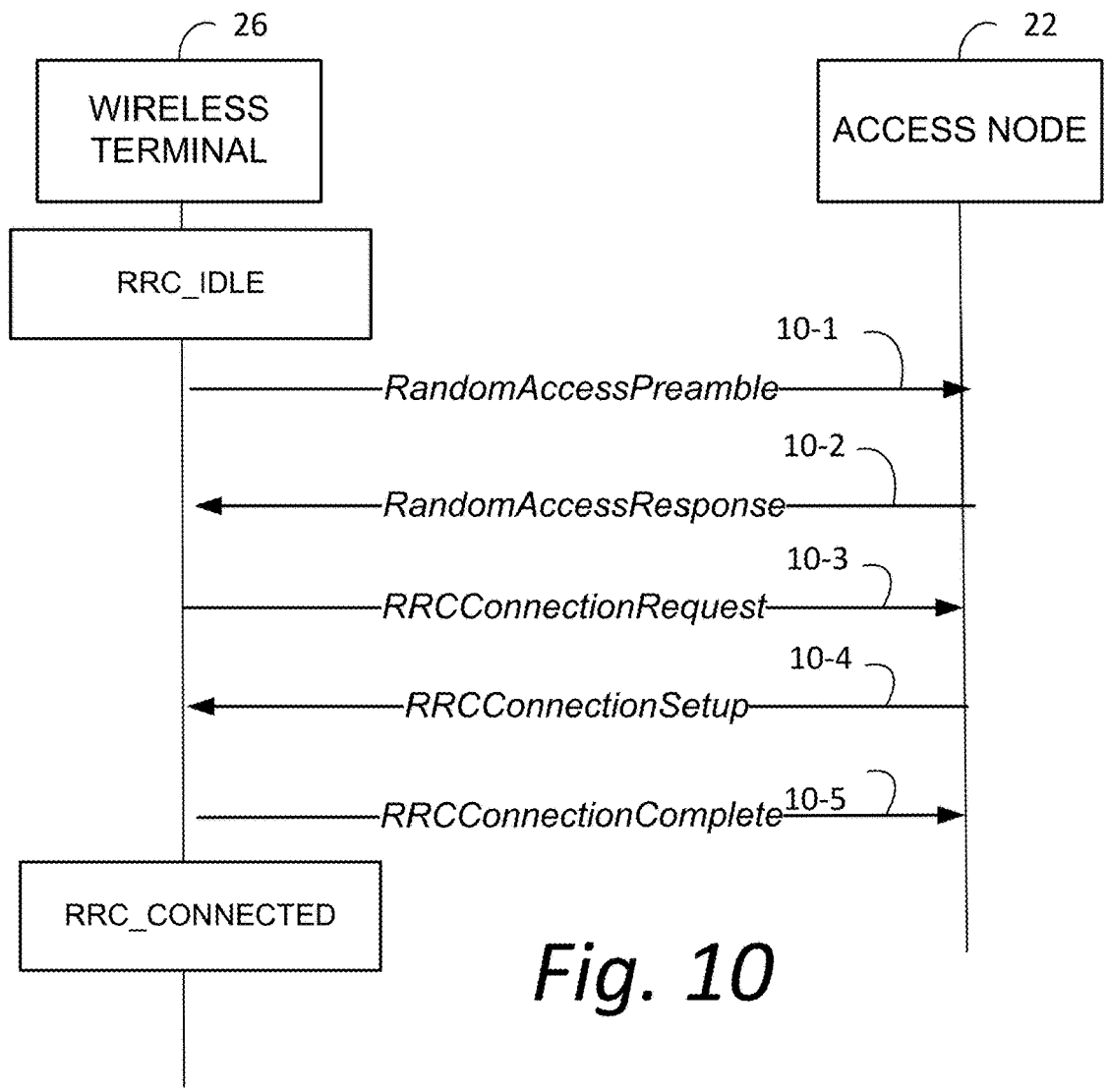
FIG. 10 is a diagrammatic view showing, e.g., an example procedure of a state transition from RRC_IDLE to RRC_CONNECTED including a connection establishment procedure.

FIG. 10 shows an example procedure of the state transition from RRC_IDLE to RRC_CONNECTED, triggered by some event, such as uplink user/signaling data transfer, receipt of a paging from the network, etc. The wireless terminal initiates the connection establishment procedure. The connection establishment procedure comprises messages including Random Access Preamble (act 10-1), RandomAccessResponse (At 10-2), RRC ConnectionRequest (Act 10-3), RRC ConnectionSetup (Act 10-4), and RRCConnectionSetupComplete (Act 10-5) as shown in FIG. 10. After this procedure, the wireless terminal enters RRC_CONNECTED state. The wireless terminal and the access node may then perform data transaction (not shown in FIG. 10).

Figure 11:
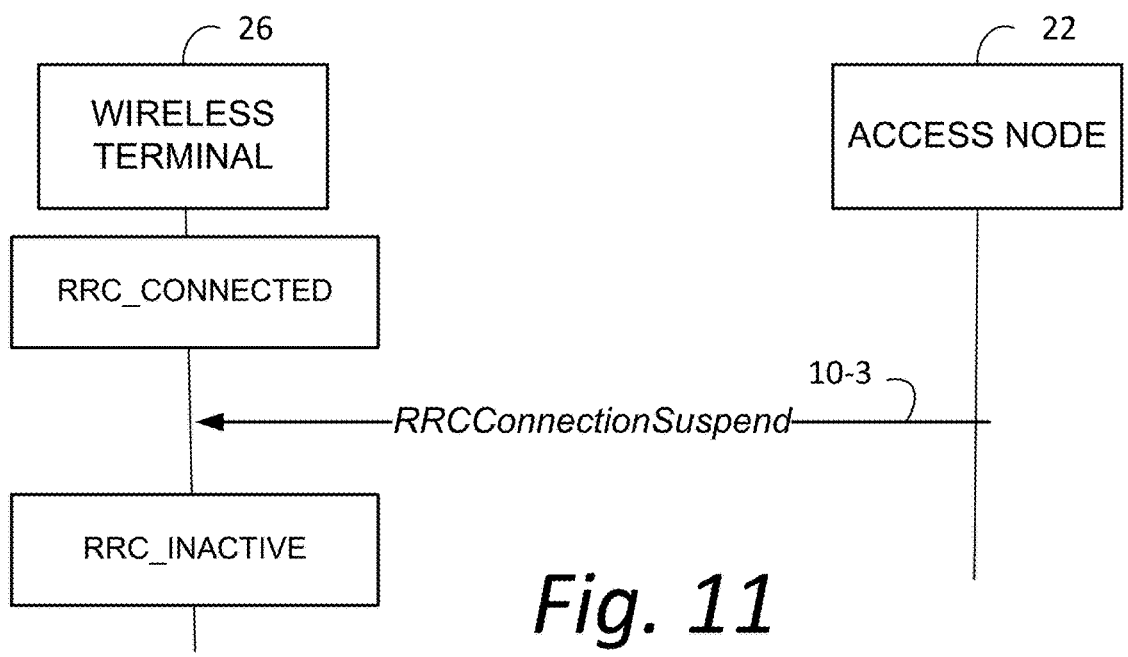
FIG. 11 is a diagrammatic view showing, e.g., an example procedure of a state transition from RRC_CONNECTED to RRC_INACTVE wherein the wireless terminal is placed in RRC_INACTIVE by sending RRCConnectionSuspend message.

FIG. 11 shows an example procedure of the state transition from RRC_CONNECTED to RRC_INACTVE. During the RRC_CONNECTED, the current access node, e.g., the access node that currently maintains connection with the wireless terminal, may decide to place the wireless terminal on RRC_INACTIVE by sending RRCConnectionSuspend (act 11-1) to the UE. This may happen, for example, when the access node detects data inactivity for a pre-determined duration. The access node may be the same as the access node in FIG. 10 if the wireless terminal is stationary or may be different if the wireless terminal has performed a handover after the connection establishment.

The RRCConnectionSuspend message may include the information elements resumeIdentity and ran-NotificationAreaInfo, where resumeIdentity identifies the wireless terminal-specific AS context saved in the RAN, and where ran-NotificationAreaInfo comprises parameters indicating the RAN-based notification area (RNA). In one example implementation, the RRCConnectionSuspend message may be formatted as shown in Listing 1, wherein the RNA is specified as a list of cell identifications, a list of tracking area codes or a list of combinations of a tracking area code and a list of RAN area codes.

Listing 1

```
-- ASN1START
RRCConnectionSuspend ::=        SEQUENCE {
    criticalExtensions              CHOICE {
        c1              ^           CHOICE {
            rrcConnectionRelease
            RRCConnectionSuspend-IEs,
                spare3 NULL, spare2 NULL, spare1 NULL
        },
        criticalExtensionsFuture    SEQUENCE { }
    }
}
RRCConnectionSuspend-IEs ::=    SEQUENCE {
    resumeIdentity                  ResumeIdentity
    ran-NotificationAreaInfo        RAN-NotificationAreaInfo
    nonCriticalExtension            RRCConnectionSuspend-vxyz-IEs
    OPTIONAL
}
ResumeIdentity ::=              BIT STRING (SIZE(40))
RAN-NotificationAreaInfo ::=    CHOICE {
    cellList            SEQUENCE (SIZE (1..FFS)) OF CellGlobalIdNR,
    ran-AreaConfigList  RAN-AreaConfigList,
}
RAN-AreaConfigList  ::=SEQUENCE (SIZE (1..FFS)) OF RAN-
AreaConfig
RAN-AreaConfig ::=  SEQUENCE {
    trackingAreaCode            TrackingAreaCode
    ran-AreaCodeList            SEQUENCE (SIZE (1..FFS)) OF
    RAN-AreaCode        OPTIONAL
}
RAN-AreaCode ::=                BIT STRING (SIZE (FFS))
CellGlobalIdNR ::=              SEQUENCE {
    plmn-Identity                   PLMN-Identity,
    cellIdentity                    CellIdentity
}
-- ASN1STOP
```

After entering RRC_INACTIVE, the wireless terminal may roam in the RAN-based notification area and perform normal cell reselections. Upon entering a new cell, the wireless terminal may acquire SIB1, which may include a cell identity, tracking area code and optionally a RAN area code, and then check if the cell is within the area configured to the wireless terminal by ran-NotificationAreaInfo. For instance, if configured with an RNA consisting of a list of cell identities, the wireless terminal may check if the cell identity broadcasted via SIB1 is in the list. Likewise, if configured with an RNA consisting of a list of tracking area codes, the wireless terminal may check if the tracking area code broadcasted via SIB1 is in the list. In the case where the broadcasted tracking area code is found in the list of tracking area codes, the wireless terminal may further check if the tracking area code in the list is associated with a list of RAN area codes. If so, the wireless terminal may additionally check if the RAN area code broadcasted in SIB1 can be found in the list of RAN area codes. If the check is positive, the wireless terminal may take no further action, otherwise, may perform RAN-based notification area update (RNAU).

Figure 12:
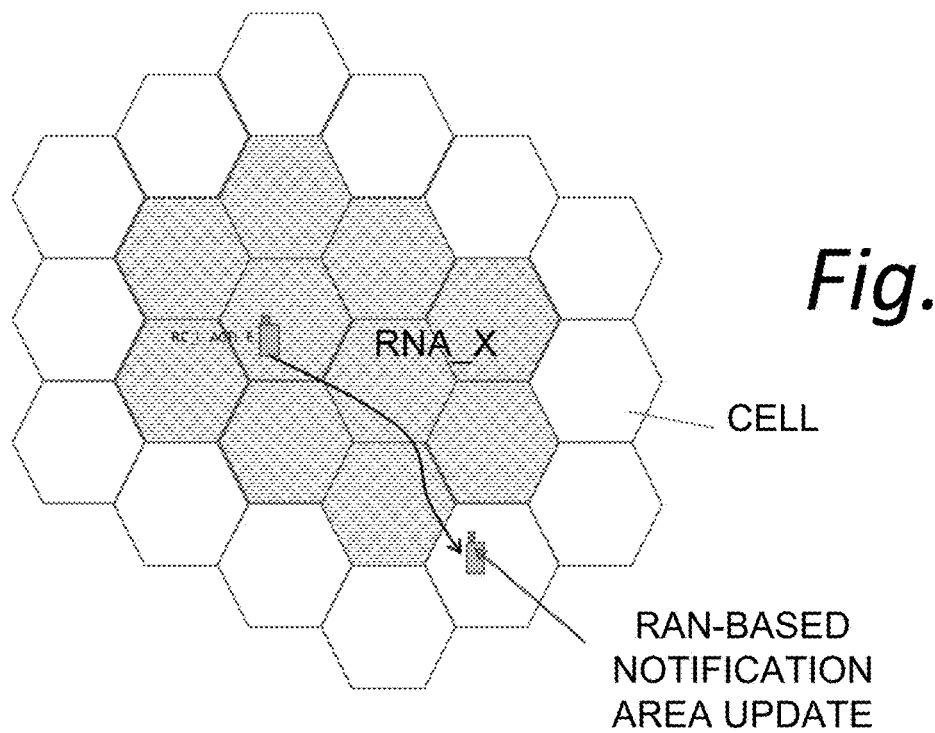
FIG. 12 is a diagrammatic view showing, e.g., a wireless terminal moving out of an area configured by RNA_X and performing a RAN-based notification area update (RNAU).

FIG. 12 is an example scenario wherein the wireless terminal moves out of the area configured by RNA_X and performs RAN-based notification area update (RNAU). The area configured by RNA_X is shown as an area of ten hexagonal cells which are stippled in appearance in FIG. 12. As described above, RNA_X may be a list of cell identifications, a list of tracking area codes or a list of combinations of a tracking area code and a list of RAN area codes.

Figure 13A:
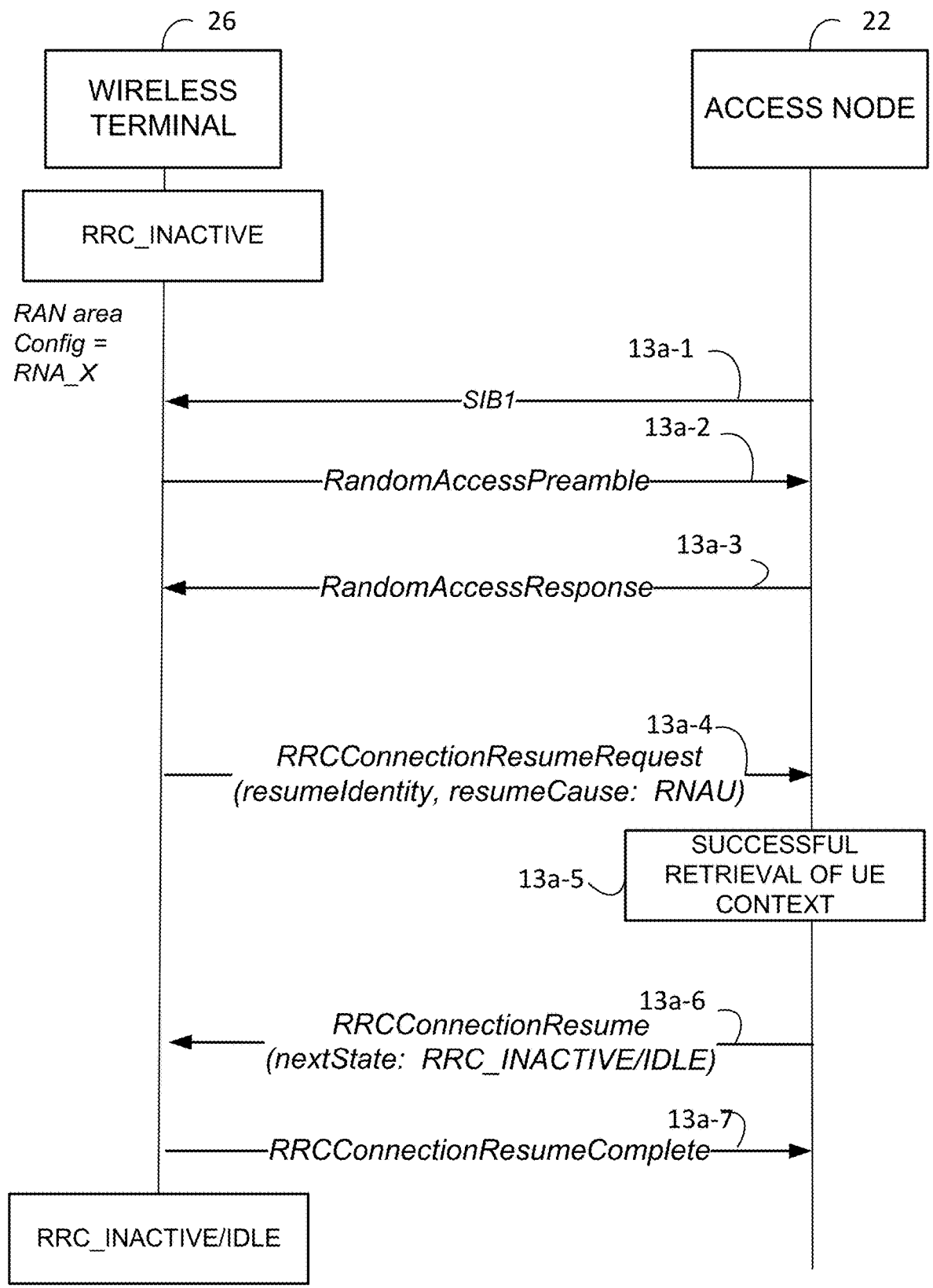
FIGS. 13A and 13B are diagrammatic views showing, e.g., a procedure of RAU, where a wireless terminal acquires a SIB1 during the cell reselection.
Figure 13B:
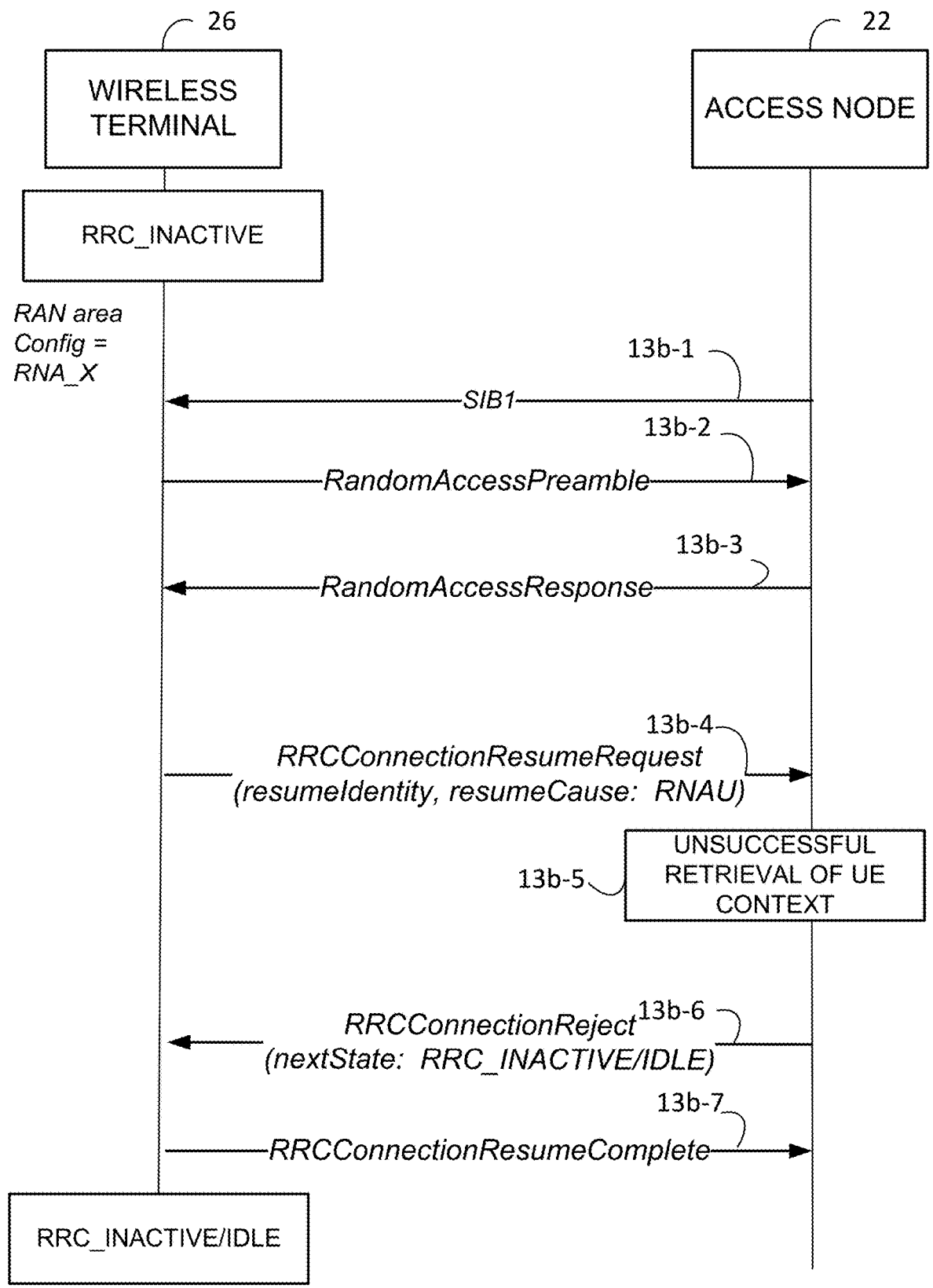

FIGS. 13A and 13B show examples of the procedure of RNAU, where the wireless terminal acquires SIB1 during the cell reselection, as shown by act 13a-1 and act 13b-1. The SIB1 indicates that this cell does not belong to RNA_X. The wireless terminal may then initiate a RNAU by performing Random Access Preamble/Response, shown by the RandomAccessPreamble message of acts 13a-2 and 13b-2 and the RandomAccessResponse messages of act 13a-3 and 13b-3, followed by sending RRCConnectionResumeRequest (act 13a-4 and act 13b-4). The RRCConnectionResumeRequest message may include resumeIdentity, an information element which may have been obtained during the procedure shown in FIG. 11, as well as resumeCause, an information element which presents the reason to initiate this resume request. In the example scenario shown in FIG. 13A and FIG. 13B, "RNAU" is set to resumeCause. Upon receiving RRCConnectionResumeRequest the access node may attempt to retrieve the wireless terminal-specific context identified by resumeIdentity. In one configuration, resumeIdentity may indicate the location in the RAN where the context is saved. In another configuration, the context is saved in a well-known location. When the retrieval of the context is successful, as shown by act 143-5 in FIG. 13A, the access node may response back to the wireless terminal with RRCConnectionResume (act 13a-6) as shown in FIG. 13A. If the access node fails or decides not to fetch the context of the wireless terminal, as shown by act 13b-5 of FIG. 13B, the access node may respond with RRCConnectionResumeReject as shown by act 13b-6 in FIG. 13B. In either case, the access node may indicate the next RRC state (nextState) that the wireless terminal should transition to; RRC_INACTIVE if the network decides to preserve/maintain the UE context, or RRC_IDLE otherwise.

Figure 14A:
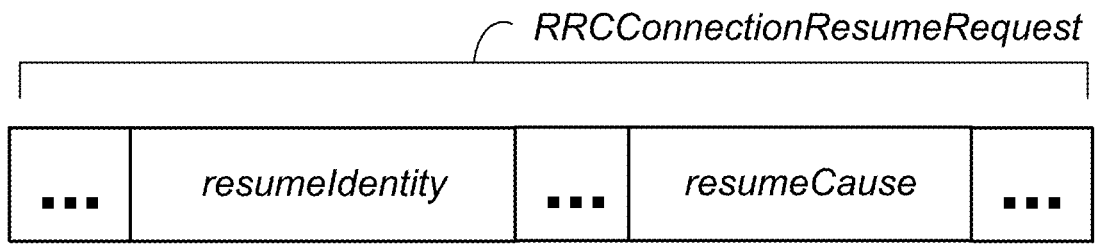
FIGS. 14A, 14B and 14C are diagrammatic views showing, e.g., example formats of the messages RRCConnectionResumeRequest, RRCConnectionResume and RRCConnectionResumeReject, respectively.
Figure 14B:
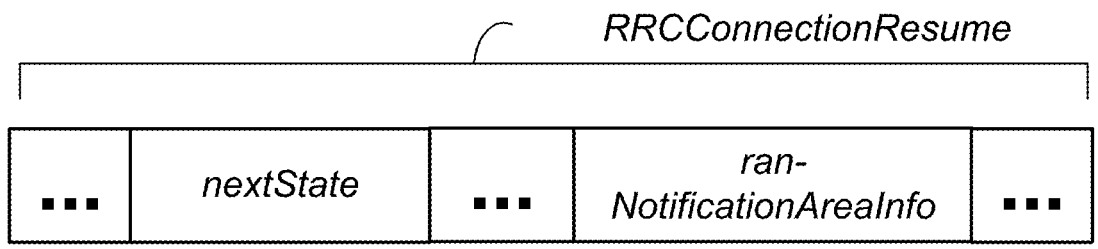
Figure 14C:
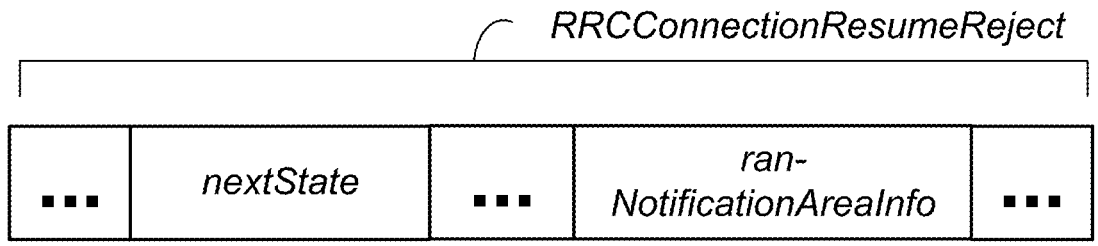

FIGS. 14A, 14B and 14C are non-limiting example formats of RRCConnectionResumeRequest, RRCConnectionResume and RRCConnectionResumeReject, respectively. The RRCConnectionResumeRequest (see FIG. 14A) may comprise resumeIdentity and resumeCause information element and. The resumeCause may indicate a reason to send a RRCConnectionResumeRequest message, such as RNAU, mobile-originated data, mobile-terminated data and mobile-originated signaling. The RRCConnectionResume message (see FIG. 14B) or RRCConnectionResumeReject message (see FIG. 14C) comprise nextState that instructs the next RRC state, as well as ran-NotificationAreaInfo to re-configure the wireless terminal with a new RNA. In one configuration, ran-NotificationAreaInfo may be optional and may not be present when nextState is other than RRC_INACTIVE.

Figure 15:
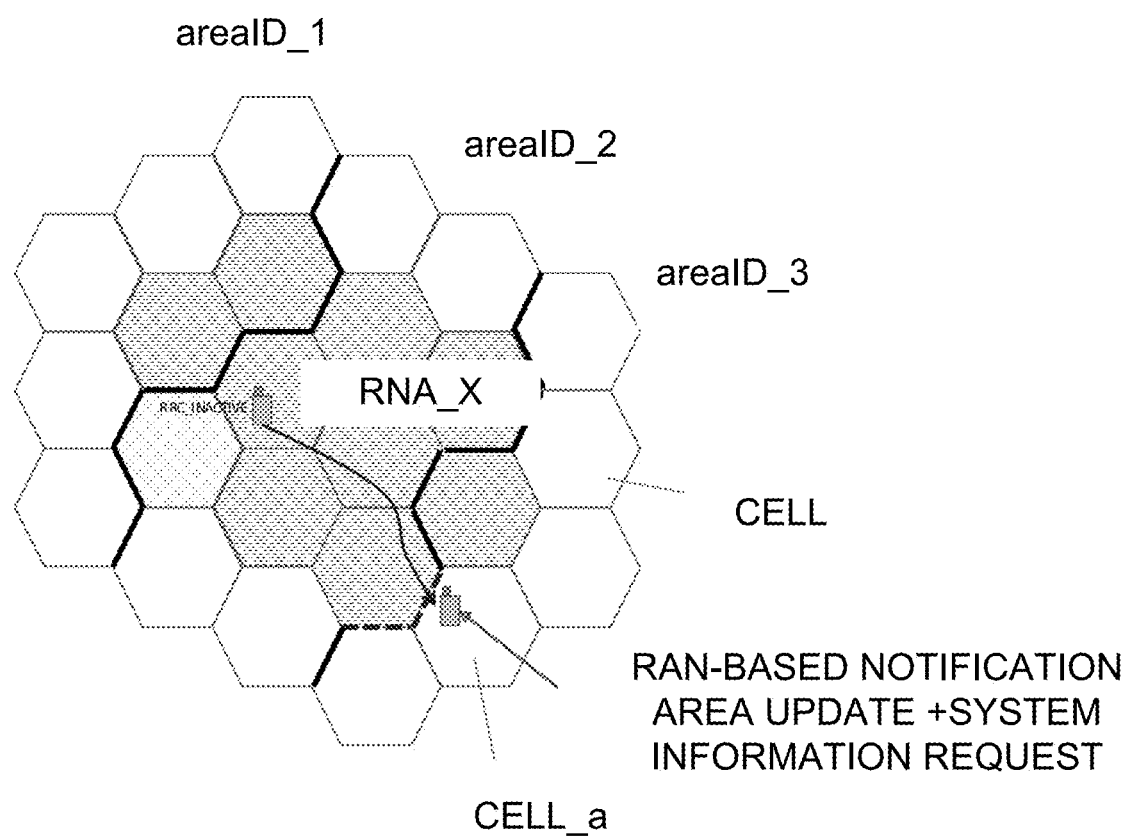
FIG. 15 is a diagrammatic view showing, e.g., a wireless terminal moving out of a system information validity area having a boundary which coincides with a boundary of a RAN-based notification area.

In some cases of network configurations, a boundary of system information validity area may coincide with a boundary of a RAN-based notification area. In other words, a part of the boundary of the RAN-based Notification Area (RNA) currently configured to the wireless terminal shares a part of the boundary of two SI validity areas. When the wireless terminal in RRC_INACTIVE moves across such a part, the wireless terminal may be required to perform RNAU, as well as the SI acquisition process. FIG. 15 illustrates an exemplary configuration of RNA and SI validity areas, where SI validity areas (areaID_1, areaID_2 and areaID_3) are configured in the network for a SIB of concern (SIB#A herein), whereas the RNA (RNA_X) is also configured to the wireless terminal as shown in FIG. 15. In FIG. 15, the ten hexagonal cells comprising the RNA area RNA_X are shown with stippled filling, the boundaries of the SI validity areas are shown by bold lines, and a joint boundary of the area RNA_X and the area areaID_3 is shown with a dotted bold line.

In an example embodiment and mode, in a situation such as that shown in FIG. 15, a wireless terminal in RRC_INACTIVE first acquires the SI message including SIB#A while it is in areaID_2. When moving across the boundary marked in the dotted bold line in FIG. 15, the wireless terminal may reselect the new cell (cell_a in FIG. 15) and acquire SIB1. This newly acquired SIB1 indicates that the cell does not belongs to RNA_X and that the SI validity area for SIB#A is areaID_3. Knowing that it is now out of the RNA configuration for RNA_X and that the stored SIB#A is invalid, the wireless terminal in FIG. 15 may perform a RNAU and a SI request in a combined manner. It is assumed in this scenario that the SIB1 acquired from cell_a indicates that the SI message for SIB#A is to be delivered on-demand basis.

Figure 16:
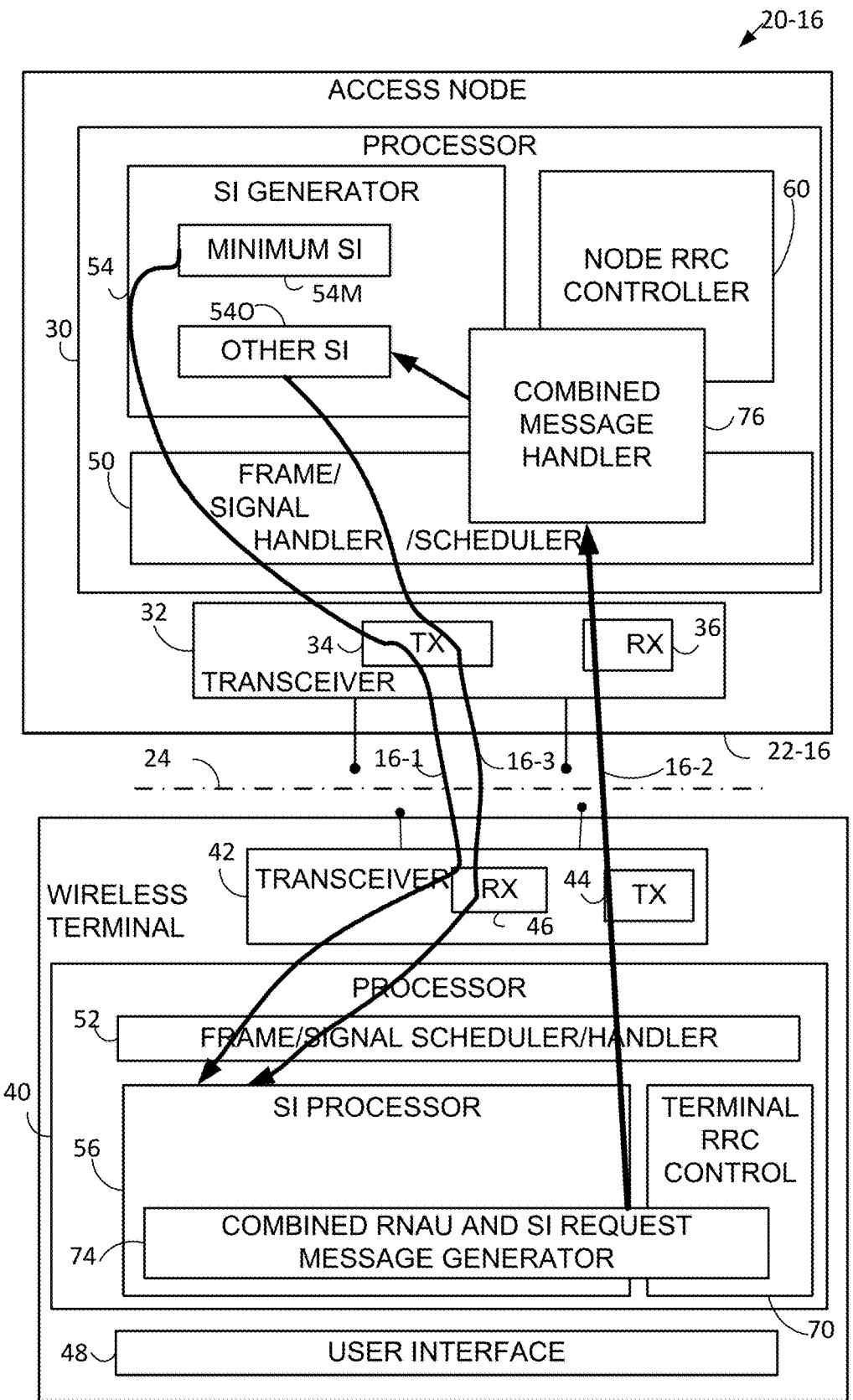
FIG. 16 is a schematic view showing an example generic communications system comprising a radio access node and a wireless terminal, wherein the wireless terminal requests/performs a RAN-based notification area update (RNAU) and SI request in combined manner.

FIG. 16 shows an example communications system 20-16 wherein radio access node 22-16 communicates over air or radio interface 24 (e.g., Uu interface) with wireless terminal 26-16, and the wireless terminal 26-16 requests and/or performs a RAN-based notification area update (RNAU) and SI request in combined manner, for an example situation such as that shown in FIG. 15. As mentioned above, the radio access node 22-16 may be any suitable node for communicating with the wireless terminal 26-16, such as a base station node, or eNodeB ("eNB") or gNB, for example. Components and functionalities of node 22-16 and wireless terminal 26-16 are understood with respect to the previously described example embodiment and mode of FIG. 2, and similarly referenced components have same or similar function unless otherwise noted below. By way of non-limiting example, node 22-16 comprises node processor circuitry ("node processor 30") and node transceiver circuitry 32 (comprising node transmitter circuitry 34 and node receiver circuitry 36), and wireless terminal 26-16 comprises terminal processor 40 and terminal transceiver circuitry 42 (comprising terminal transmitter circuitry 44 and terminal receiver circuitry 46) and, optionally, user interface 48. As in the FIG. 2 example embodiment and mode, node processor 30 of radio access node 22 includes system information (SI) generator 54 wireless terminal 26-16 comprises SI processor 56 which, e.g., facilitates obtaining and use of system information. The previously described concepts of Minimum SI and Other SI are also applicable to the example embodiment and mode of FIG. 16.

To address the situation and scenario shown in FIG. 15, terminal processor 40 of wireless terminal 26-16 comprises combined RNAU/SI request message generator 74. As such, the wireless terminal 26-16, which communicates over radio interface 24 with an access node 22-16, comprises receiver circuitry, e.g., terminal receiver 46; terminal processor 40, which includes the combined RNAU/SI request message generator 74; and transmitter circuitry, e.g., terminal transmitter 44. The receiver circuitry is configured to receive first type system information (SI) from the access node. FIG. 16 shows by arrow 16-1 the wireless terminal 26-16, and SI processor 56 in particular, via terminal receiver 46, receiving the first type system information. As understood from the foregoing, the first type system information comprises: availability of second type SI messages, a second type SI message comprising at least one system information block (SIB); scheduling information of each of the SI messages, the scheduling information specifying downlink radio resources to be used for transmitting the SI message; and, an indication of a delivery mode for each of the second type SI messages, the delivery mode being either periodic broadcast or on-demand basis. The terminal processor 40, and combined RNAU/SI request message generator 74 in particular, is configured, when the wireless terminal 26-16 is in an inactive state, to generate a message configured both to initiate a RAN-based area update (RNAU) procedure and to request transmission of at least one SI message. Stated another way, the terminal processor 40 is configured to initiate a RAN-based notification area update (RNAU) procedure while the wireless terminal 26-16 is in an inactive state by generating a resume request message including an SI request information element which request transmission of at least one SI message. The transmitter circuitry is configured to transmit the message. FIG. 16 shows by arrow 16-2 the terminal transmitter 44 of wireless terminal 26-16 transmitting a combined RNAU/SI request message to radio access node 22-16.

The radio access node 22-16 of FIG. 16 communicates over radio interface 24 with wireless terminal 26-16, and comprises transmitter circuitry, e.g., node transmitter 34, node processor 30, and receiver circuitry, e.g., core node receiver 36. The transmitter circuitry 34 is configured to transmit the first type system information (SI). As mentioned above, the first type system information comprises: availability of second type SI messages, the second type SI messages comprising at least one system information block (SIB); scheduling information for each of the SI messages, the scheduling information specifying downlink radio resources to be used for transmitting the respective SI message; and, an indication of a delivery mode for each of the second type SI messages, the delivery mode being either periodic broadcast or on-demand basis. As explained above, arrow 16-1 in FIG. 16 depicts transmission of the first type system information (SI). The receiver circuitry 36 is configured to receive a message from wireless terminal 26-16 that is configured both to initiate a RAN-based area update (RNAU) procedure and to request transmission of at least one of the SI message. Such combined message is shown by arrow 16-2 in FIG. 16. The node processor circuitry 30 configured to make a determination whether to transmit at least one of the requested SI message requested by the message. In an example implementation the node processor 30 comprises combined message handler 76, which is configured to handle the combined RNAU/SI request message generated by combined RNAU/SI request message generator 74 of wireless terminal 26-16. The combined message handler 76 may comprise or work in conjunction with node frame/signal scheduler/handler 50, node RRC controller 60, and Node SI generator 54. The transmitter circuitry 34 is further configured to transmit the at least one of the requested SI messages based on the corresponding scheduling information. FIG. 16 shows transmission by at least one requested SI message by arrow 16-3.

Figure 17:
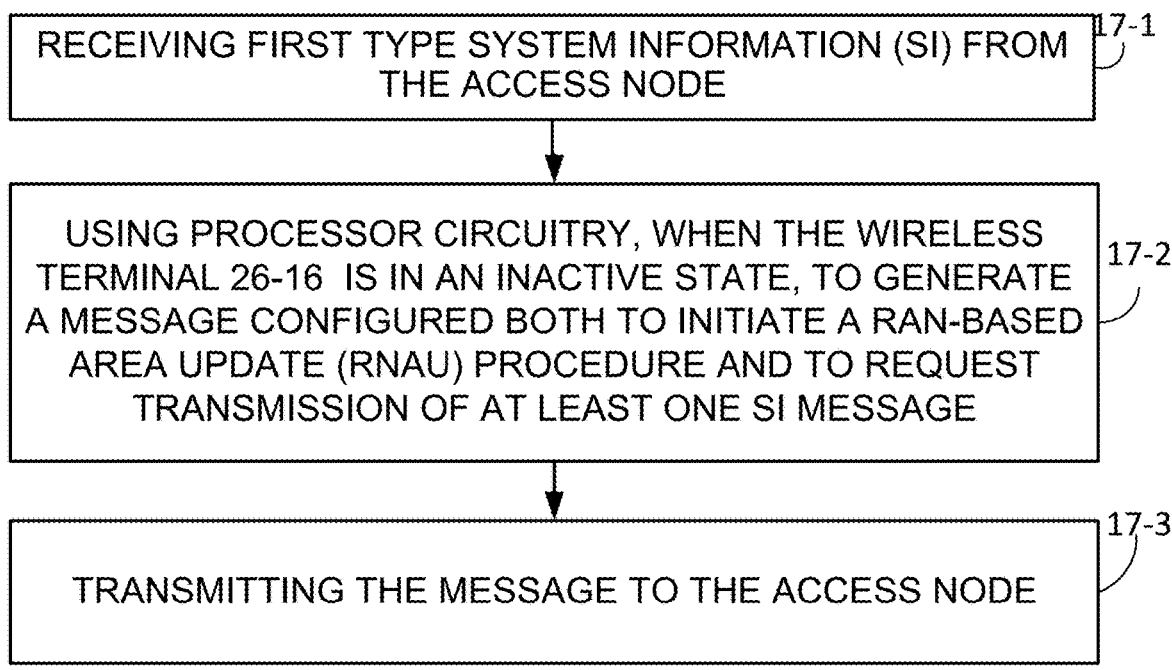
FIG. 17 is a flowchart showing example, representative acts or steps performed by a wireless terminal in an example implementation of the example embodiment and mode of FIG. 16.

FIG. 17 shows example, non-limiting, representative acts or steps performed by wireless terminal 26-16 in a basic example mode. Act 17-1 comprises the wireless terminal 26-16 receiving first type system information (SI) from the access node (also shown by arrow 16-1 in FIG. 16). Act 17-2 comprises using processor circuitry, e.g., using combined RNAU/SI request message generator 74, when the wireless terminal 26-16 is in an inactive state, to generate a message configured both to initiate a RAN-based area update (RNAU) procedure and to request transmission of at least one SI message. Act 17-3 comprises the wireless terminal 26-16, and terminal transmitter 44 in particular, transmitting the message which was generated as act 17-2 to access node 22-16. The message generated by act 17-2 is also shown by arrow 16-2 in FIG. 16.

Figure 18:
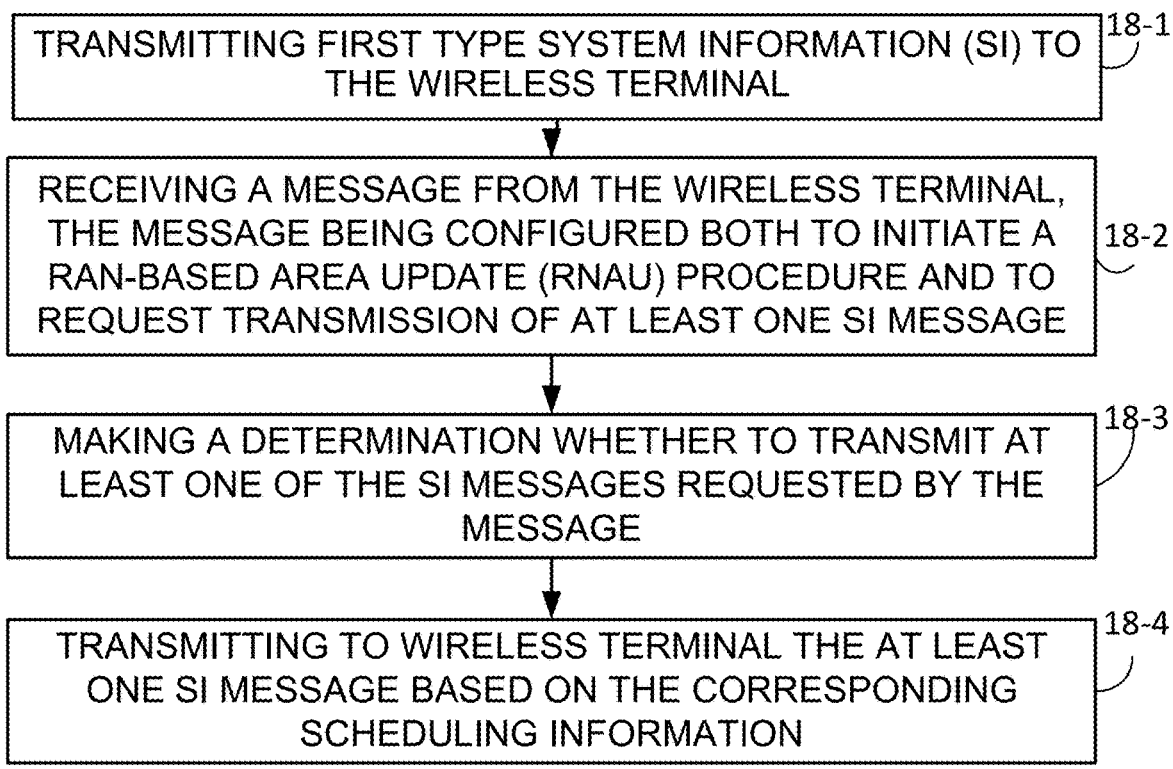
FIG. 18 is a flowchart showing example, representative acts or steps performed by an access node in in an example implementation of the example embodiment and mode of FIG. 16.

FIG. 18 shows example, non-limiting, representative acts or steps performed by access node 22-16 in a basic example mode. Act 18-1 comprises the access node 22-16 transmitting first type system information (SI) to wireless terminal 26-16, in the manner also shown by arrow 16-1 of FIG. 16. Act 18-2 comprises the access node 22-16 receiving a message from the wireless terminal 26-16, the message being configured both to initiate a RAN-based area update (RNAU) procedure and to request transmission of at least one SI message. The message received as act 18-2, also known as the "combined message", is also depicted by arrow 16-3 in FIG. 16. Act 18-3 comprises the node processor 30, e.g., combined message handler 76, based on the message received, making a determination whether to transmit at least one of the SI messages requested by the message. Act 18-4 comprises the access node 22-16, and core node transmitter 34 in particular, transmitting to wireless terminal 26-16 the at least one SI message based on the corresponding scheduling information. The transmission resulting from execution of act 18-4 is also depicted by arrow 16-3 in FIG. 16.

Figure 19:
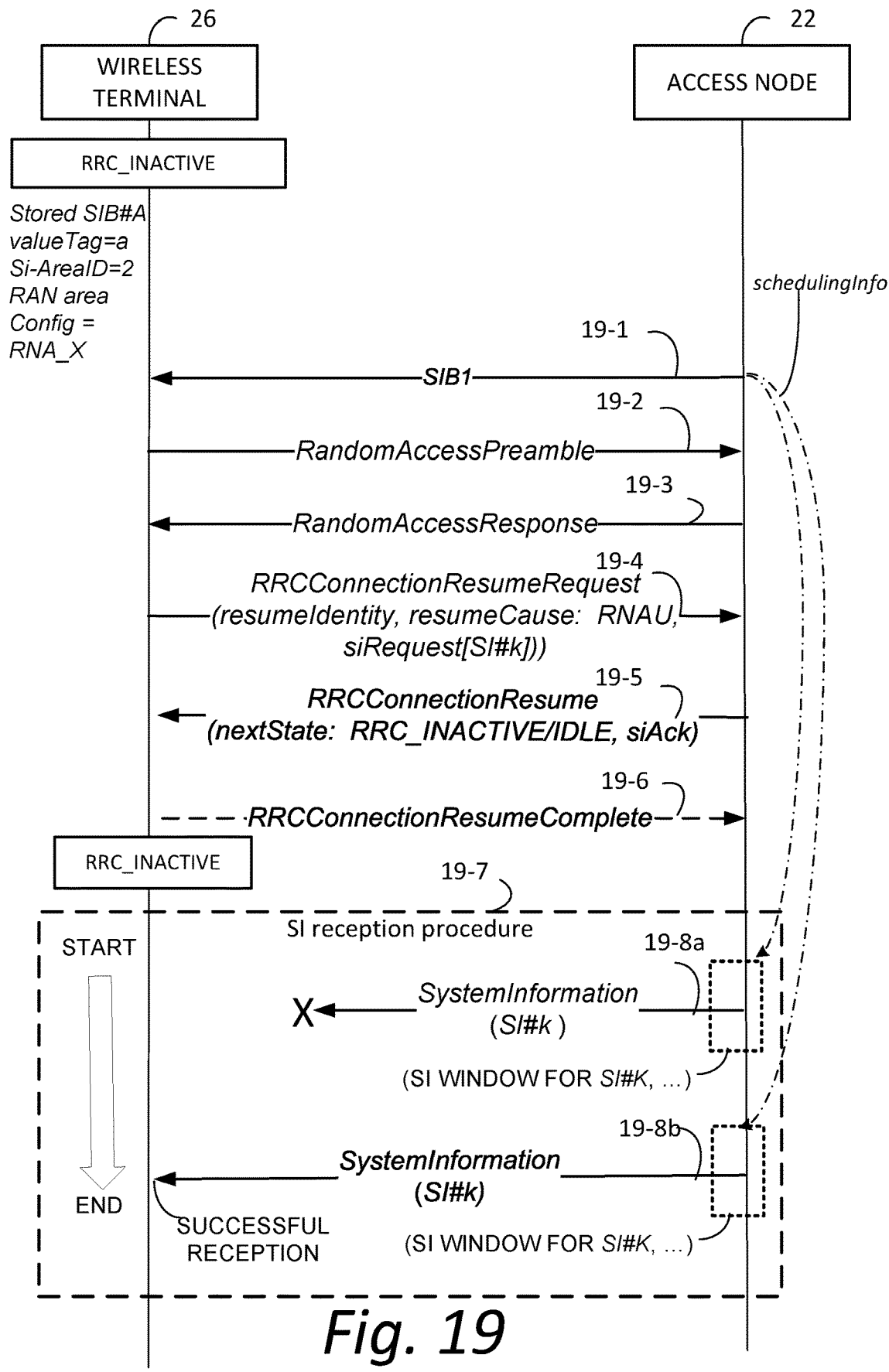
FIG. 19 is a diagrammatic view showing, e.g., transmission of a combined RNAU/SI request message and execution of a SI reception procedure and wherein the RAN-based notification area update (RNAU) request is accepted.

FIG. 19 shows the transmission of a combined RNAU/SI request message and execution of a SI reception procedure. As shown in FIG. 19, upon reselection of cell_a (see FIG. 15), as act 19-1, the wireless terminal 26-16 first acquires SIB1, whose content is the same as shown in FIG. 7 and Table 1. As act 19-2 the wireless terminal 26-16 sends a Random Access Preamble message and, as act 19-3, receives a Random Access Response message. As act 19-4 the wireless terminal 26-16 may then send a RRCConnectionResumeRequest message that indicates both RNAU and a SI request. The RRCConnectionResumeRequest message of act 19-4 is thus an example of the "combined" message generated by combined RNAU/SI request message generator 74. In response, as act 19-5 the access node 22-16 may send a RRCConnectionResume message to the wireless terminal, which may include acknowledgement(s) of the RNAU and the SI request. The acknowledgement of the SI request is shown as siACK. In this scenario, the RRCConnectionResume message of act 19-5 may instruct the wireless terminal 26-16 to go back to RRC_INACTIVE, in other words, not to transition to RRC_CONNECTED or to RRC_IDLE. The wireless terminal 26-16 may or may not send a RRCConnectionResumeComplete message (depicted by act 19-6), but regardless, may start the SI reception procedure 19-7, e.g., as described in the embodiment of FIG. 7 to acquire the requested SI message(s). In the SI reception procedure 19-7 the wireless terminal 26-16 monitors signals from the access node in the designated SI windows (shown by dotted rectangles in FIG. 19) derived from the scheduling information (scheduleInfo) in the SIB1, and thereby attempts to receive the requested SI#k. FIG. 19 shows by act 19-8*a* a first transmission of the requested SI#k, which is unsuccessful, and by act 19-8*b* a second transmission of the requested SIB#, which is successful. A tail of a vertical down-pointing arrow in the SI reception procedure depiction of FIG. 19 is associated with start of the SI reception procedure, while the head of the same vertical down-pointing arrow is associated with end of the SI reception procedure, e.g., at successful reception of the SI#k.

Figure 20C:
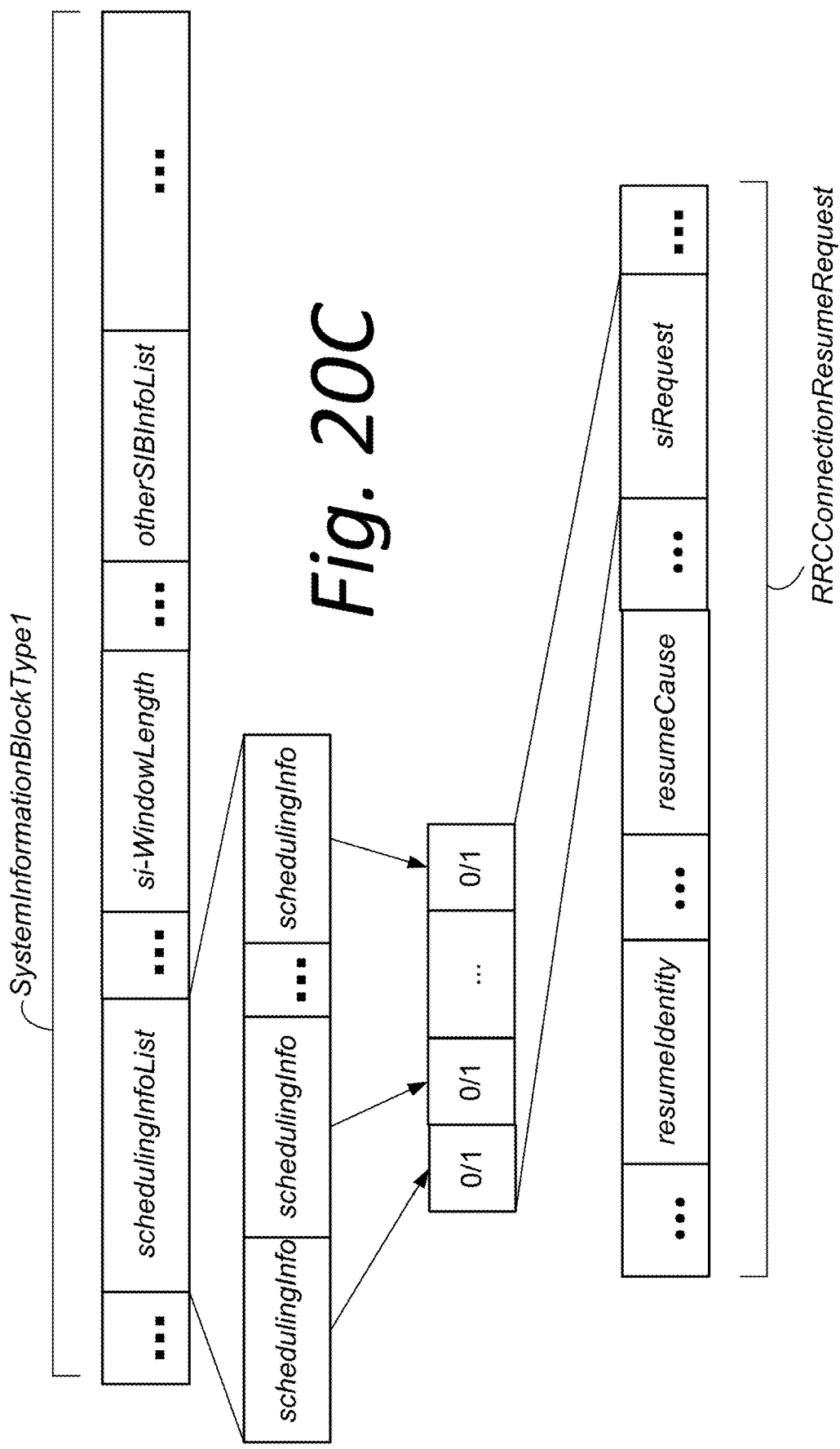
FIG. 20C is a diagrammatic view showing, e.g., an example format of a siRequest information element that may comprise a bit map.

FIG. 20A and FIG. 20B are non-limiting example formats of RRCConnectionResumeRequest, e.g., of act 19-4, and RRCConnectionResume, e.g., of act 19-5, respectively. The RRCConnectionResumeRequest may comprise the resumeIdentity, resume Cause and siRequest information elements. The resumeIdentity and resume Cause information elements may be the ones described in the embodiment of FIG. 14A. The siRequest indicates SI message(s) that the wireless terminal desires to receive. In one configuration, as shown in FIG. 20C, the siRequest may comprise a bit map, wherein each bit corresponds to a schedulingInfo information element in SIB1 of the current serving cell, the bits arranged in the order of schedulingInfo information elements. By doing so, each bit of the bit map may correspond to a specific SI message. Alternatively, siRequest may carry only one bit indicating that the wireless terminal desires to receive at least one on-demand basis SI message. In this case, the access node may start broadcast all of the on-demand basis SI messages for a pre-configured duration. The RRCConnectionResume message shown in FIG. 20B comprises nextState, ran-NotificationAreaInfo (both as described in the embodiment of FIG. 14B or FIG. 14C) as well as siAck, an information element for acknowledging siRequest. The siAck information element may be present only when siRequest is included in RRCConnectionResumeRequest. In one configuration, siAck may comprises the same bit map as the one in RRCConnectionResumeRequest, indicating the SI message(s) to be broadcasted. Alternatively, siAck may comprise one Boolean field, indicating whether the request has been accepted or not. In one configuration, ran-NotificationAreaInfo may be optional and may not be present when nextState is other than RRC_INACTIVE.

Furthermore, in an example, non-limiting implementation, receipt of the RRCConnectionResume message may implicitly indicate that the SI request is accepted. In this case, the siAck may not be present in the message and the wireless terminal may be configured or pre-configured to always assume that the SI request is granted when receiving the RRCConnectionResume message. Alternatively, in another example implementation, the wireless terminal may be configured or preconfigured to assume that the SI request is rejected if siAck is not present in RRCConnectionResume.

Figure 21:
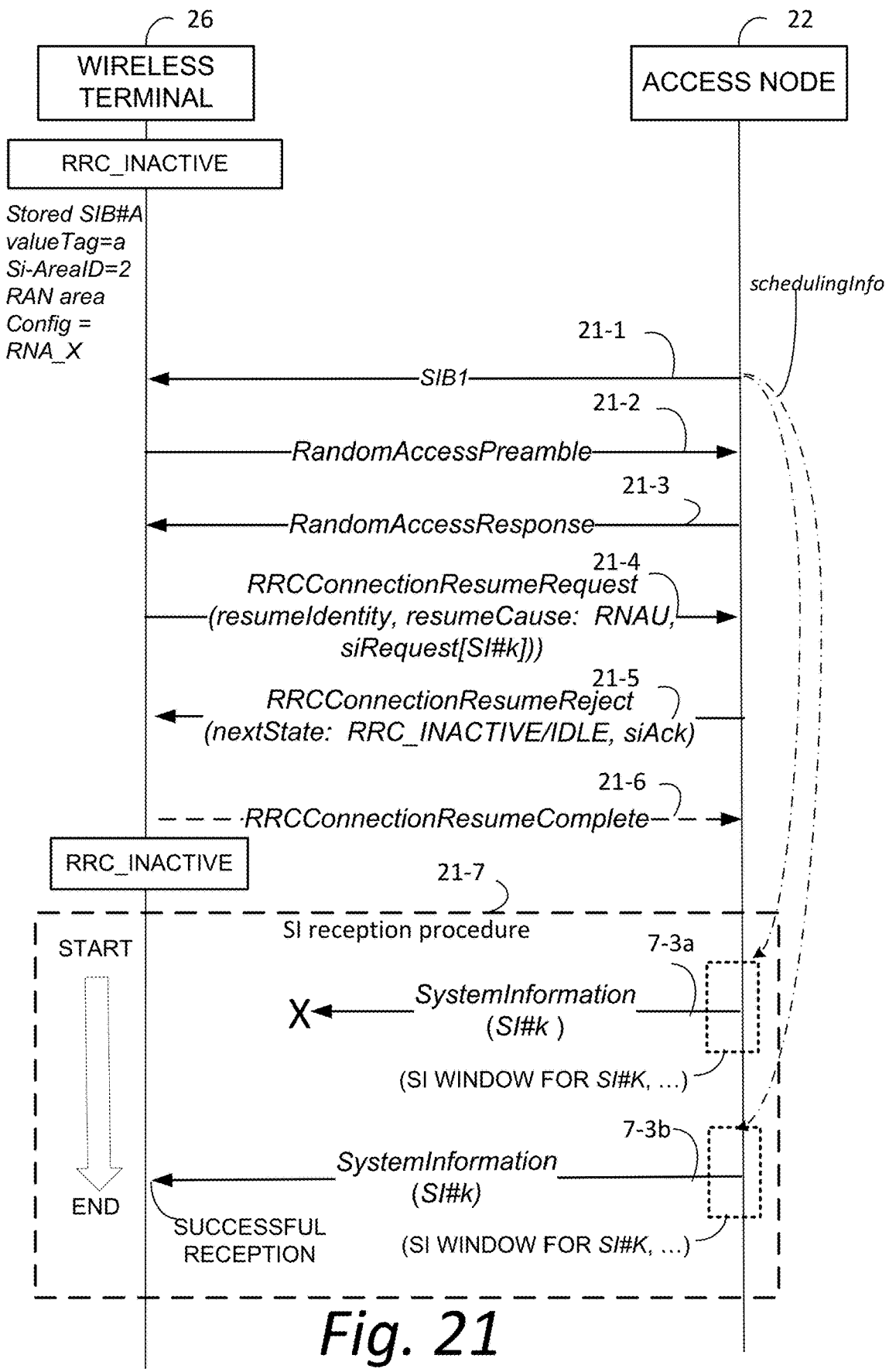
FIG. 21 is a diagrammatic view showing, e.g., transmission of a combined RNAU/SI request message and execution of a SI reception procedure but wherein the RAN-based notification area update (RNAU) request is rejected.

Yet another example embodiment and mode deals with a case where the RNAU is rejected by the access node but the SI request combined in the RNAU is granted. This further example embodiment and mode is illustrated by FIG. 21, which shows a non-limiting example message sequence which is identical to the scenario shown in FIG. 19 up to the act 19-5, which in FIG. 19 is sending RRCConnectionResumeRequest. For the example embodiment and mode of FIG. 21, instead of receiving RRCConnectionResume, as act 21-5 the wireless terminal of the embodiment of FIG. 21 receives a RRCConnectionResumeReject message. Other than act 21-5, the remaining acts 21-*x* of FIG. 21 are substantially the same as corresponding act 19-*x* of FIG. 19.

FIG. 22 depicts an exemplary format of RRCConnectionResumeReject, comprising nextState and siAck. In the scenario under this embodiment, the nextState information element may instruct the wireless terminal to stay in RRC_INACTIVE or go back to RRC_IDLE. The siAck may comprise the bit map or the Boolean field as disclosed in conjunction with the embodiment of FIG. 16. Similar to the embodiment of FIG. 14C, the ran-NotificationAreaInfo information element may be present if nextState is RRC_INACTIVE.

Similar to the embodiment of FIG. 16, in one example implementation, receipt of the RRCConnectionResumeReject message may implicitly indicate that the SI request is accepted. In this case, the siAck may not be present in the message and the wireless terminal may be configured or pre-configured to always assume that the Si request is granted when receiving the RRCConnectionResumeReject message. Alternatively, in another configuration, the wireless terminal may be configured or preconfigured to assume that the SI request is rejected if siAck is not present in RRCConnectionResumeReject.

Features from each of the example embodiments and modes described herein may be combined with one another. For example information elements described in conjunction with the example embodiment and mode of FIG. 2 may also be utilized with the other example embodiments and modes described herein, including but not limited to the example embodiment and mode of FIG. 16. Further, features of the "Example Embodiments" enumerated hereinafter may also be used in conjunction with one another, and in conjunction with the example embodiment and mode of FIG. 16-FIG. 22. As just one, non-limiting example, the terminology "RAN-based area identity" may comprise one or more of cell identity and tracking area code for any of the example embodiments and modes described herein.

Figure 23:
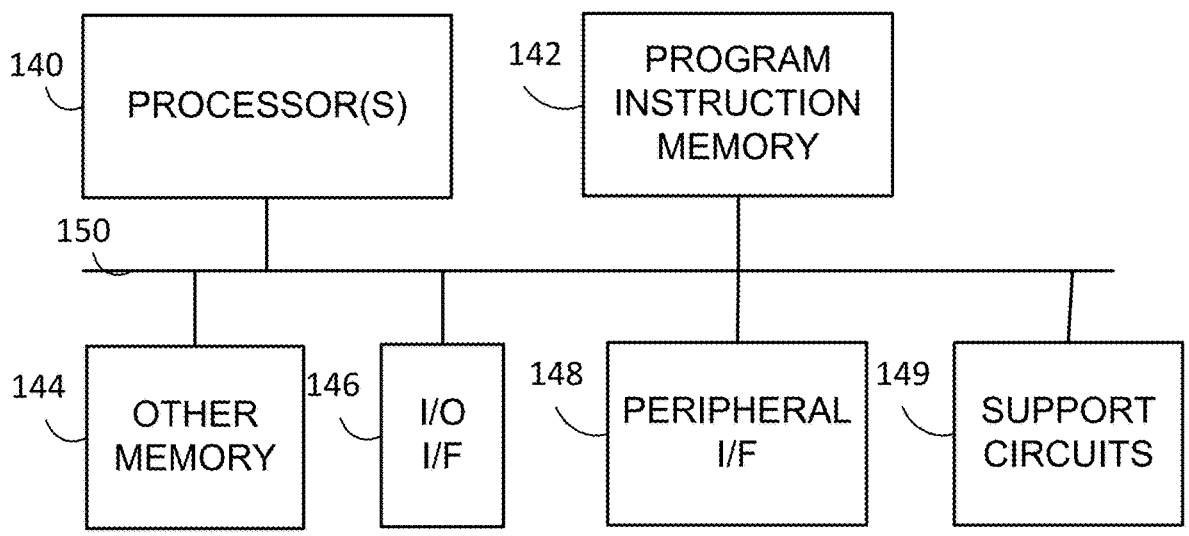
FIG. 23 is a diagrammatic view showing example electronic machinery which may comprise node electronic machinery or terminal electronic machinery.

Certain units and functionalities of node 22, node 22-16, wireless terminal 26, and wireless terminal 26-16 are, in example embodiments, implemented by electronic machinery, computer, and/or circuitry. For example, the node processors 30 and terminal processors 40 of the example embodiments herein described and/or encompassed may be comprised by the computer circuitry of FIG. 23. FIG. 23 shows an example of such electronic machinery or circuitry, whether node or terminal, as comprising one or more processor(s) circuits 190, program instruction memory 192; other memory 194 (e.g., RAM, cache, etc.); input/output interfaces 196; peripheral interfaces 198; support circuits 199; and busses 200 for communication between the aforementioned units.

The program instruction memory 192 may comprise coded instructions which, when executed by the processor(s), perform acts including but not limited to those described herein. Thus is understood that each of node processor 30 and terminal processor 40, for example, comprise memory in which non-transient instructions are stored for execution.

The memory 194, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 199 are coupled to the processors 190 for supporting the processor in a conventional manner. These circuits include cache, power supplies, clock circuits, input/output circuitry and subsystems, and the like.

Further, it should be understood that, when a processor or processor circuitry is mentioned in conjunction with any of the preceding example embodiments and modes, it should be understood that the device hosting the processor, whether wireless terminal or access node, may comprise at least one processor and at least one memory including computer program code, the memory and the computer program code being configured to, working with the at least one processor, to cause the host device to perform the functions aforedescribed.

Thus, the technology disclosed herein solves problems in the field of telecommunications, including problems in telecommunications nodes such wireless terminals and access nodes, as well as computers/processors and hardware comprising such nodes. System information is of utmost importance to the operation of telecommunication nodes, so that each node can obtain the necessary network information to coordinate and communicate with other nodes and to perform its desired functions. The system information is quite extensive and complex, and may be changeable/updateable due to network and operating conditions, for example. Efficiently obtaining and using the system information is challenging, particularly in view of numerous other telecommunications functions that may be simultaneously on-going based on the system information. The technology disclosed herein affords the communications nodes the computerized and other configuration in order to obtain the system information earlier and more efficiently, thereby avoiding waste of time and processing resources. In particular, the technology disclosed herein solves a problem that occurs when a user equipment enters a cell where both a RAN-based notification update (RNAU) and on-demand system information (SI) delivery request are to be performed. In contrast to conventional practice, using the technology disclosed herein the user equipment may send a resume request message indicating both RAN-based notification area update (RNAU) and a system information request. After receiving a response message, without need of further signaling to request the system information, the user equipment proceeds to acquiring the requested SI. Even when the response message indicates that the RNAU is rejected, the SI request may be granted. The technology disclosed herein discloses procedures to cover these scenarios.

The technology of this application thus encompasses but is not limited to the following example embodiments, example features, and example advantages:

Example Embodiment 1: A user equipment that communicates over a radio interface with an access node of a radio access network (RAN), the user equipment comprising:
  receiver circuitry configured to receive first type system information (SI) from the access node, the first type system information comprising:
    availability of second type SI messages, a second type SI message comprising at least one system information block (SIB);
    scheduling information of each of the SI messages, the scheduling information specifying downlink radio resources to be used for transmitting the SI message;
    an indication of a delivery mode for each of the second type SI messages, the delivery mode being either periodic broadcast or on-demand basis;
  processor circuitry configured, when the user equipment is in an inactive state, to generate a message configured both to initiate a RAN-based area update (RNAU) procedure and to request transmission of at least one SI message; and
  transmitter circuitry configured to transmit the message.

Example Embodiment 2: The user equipment of Example Embodiment 1, wherein the first type system information further includes validity information associated with each SIB in the available second type SI messages, the validity information comprising a value tag and a SI area identity.

Example Embodiment 3: The user equipment of Example Embodiment 23, wherein the processor circuitry is further configured to include the SI request information element in the resume request message in a case where at least one SIB in the SI message previously received and stored in the user equipment is invalid.

Example Embodiment 4: The user equipment of Example Embodiment 3, wherein a stored SIB is invalid in a case where the value tag or the SI area identity associated with the stored SIB is different from the value tag or the SI area identity associated with the SIB included in the first type system information, respectively.

Example Embodiment 5: The user equipment of Example Embodiment 1, wherein the processor circuitry initiates the RNAU procedure in a case where a RAN-based area identity in the first type system information is not included in a RAN-based notification area (RNA) configuration.

Example Embodiment 6: The user equipment of Example Embodiment 5, wherein the RNA configuration is configured in a case where the user equipment transitions to an inactive state.

Example Embodiment 7: The user equipment of Example Embodiment 5, wherein the RAN-based area identity is a cell identity and the RAN-based notification area (RNA) configuration comprises a list of cell identities.

Example Embodiment 8: The user equipment of Example Embodiment 5, wherein the RAN-based area identity is a tracking area code and the RNA configuration comprises a list of tracking area codes.

Example Embodiment 9: The user equipment of Example Embodiment 8, wherein a tracking area code in the list is associated with a list of one or more RAN area codes.

Example Embodiment 10: The user equipment of Example Embodiment 1, wherein the processor circuitry further includes in the resume request message an information element indicating that the cause of sending the resume request message is RNAU.

Example Embodiment 11: The user equipment of Example Embodiment 1, wherein the SI request information element comprises a bitmap, each bit of the bitmap associated with a SI message, the value of each bit indicating whether the delivery of the corresponding SI message is requested or not.

Example Embodiment 12: The user equipment of Example Embodiment 1, wherein the n'th bit in the bitmap corresponds to the SI message indicated by the n'th scheduling information included in the first type system information.

Example Embodiment 13: The user equipment of Example Embodiment 1, wherein the receiver circuitry is further configured to receive a response message after transmitting the resume request message.

Example Embodiment 14: The user equipment of Example Embodiment 13, wherein the response message indicates a positive result (accept) of the RNAU procedure.

Example Embodiment 15: The user equipment of Example Embodiment 13 wherein the response message indicates a negative result (reject) of the RNAU procedure.

Example Embodiment 16: The user equipment of Example Embodiment 13, wherein the response message further includes an acknowledgement of the SI request information element included in the resume request message.

Example Embodiment 17: The user equipment of Example Embodiment 16, wherein the acknowledgement comprises a bitmap, each bit of the bitmap associated with a SI message, the value of each bit whether the corresponding SI message will be transmitted or not.

Example Embodiment 18: The user equipment of Example Embodiment 17, wherein the n'th bit in the bitmap corresponds to the SI message indicated by the n'th scheduling information included in the first type system information.

Example Embodiment 19: The user equipment of Example Embodiment 16, wherein the acknowledgement indicates whether the request of SI messages in the resume request message is accepted or not.

Example Embodiment 20: The user equipment of Example Embodiment 16, wherein the receiver circuit is further configured to acquire the requested SI message(s) based on the corresponding scheduling information.

Example Embodiment 21: The user equipment of Example Embodiment 16, wherein the user equipment assumes that the request of SI messages included in the resume request message is granted in a case where the user equipment receives the response message.

Example Embodiment 22: The user equipment of Example Embodiment 16, wherein the user equipment assumes that the request of SI message(s) included in the resume request message is rejected in a case where the response message does not include the acknowledgement of the information about the requested SI message(s).

Example Embodiment 23: The user equipment of Example Embodiment 1, wherein the message is a resume request message.

Example Embodiment 24: The user equipment of Example Embodiment 1, wherein the message includes an SI request information element.

Example Embodiment 25: A method in a user equipment communicating over a radio interface with an access node of a radio access network (RAN) comprising;
receiving first type system information (SI) from the access node, the first type system information comprising:
availability of second type SI messages, a second type SI message comprising at least one system information block (SIB);
scheduling information of each of the SI messages, the scheduling information specifying downlink radio resources to be used for transmitting the SI message;
an indication of a delivery mode for each of the second type SI messages, the delivery mode being either periodic broadcast or on-demand basis;
using processor circuitry, when the user equipment is in an inactive state, to generate a message configured both to initiate a RAN-based area update (RNAU) procedure and to request transmission of at least one SI message; and
transmitting the resume request message.

Example Embodiment 26: The method of Example Embodiment 25, wherein the first type system information further includes validity information associated with each SIB in the available second type SI messages, the validity information comprising a value tag and a SI area identity.

Example Embodiment 27: The method of Example Embodiment 26, wherein further including the SI request information element in the resume request message in a case where at least one SIB in the SI message previously received and stored in the user equipment is invalid.

Example Embodiment 28: The method of Example Embodiment 27, wherein a stored SIB is invalid in a case where the value tag or the SI area identity associated with the stored SIB is different from the value tag or the SI area identity associated with the SIB included in the first type system information, respectively.

Example Embodiment 29: The method of Example Embodiment 25, wherein initiating the RNAU procedure in a case where a RAN-based area identity in the first type system information is not included in a RAN-based notification area (RNA) configuration.

Example Embodiment 30: The method of Example Embodiment 29, wherein the RNA configuration is configured in a case of transitioning to an inactive state.

Example Embodiment 31: The method of Example Embodiment 29, wherein the RAN-based area identity is a cell identity and the RAN-based notification area (RNA) configuration comprises a list of cell identities.

Example Embodiment 32: The method of Example Embodiment 29, wherein the RAN-based area identity is a tracking area code and the RNA configuration comprises a list of tracking area codes.

Example Embodiment 33: The method of Example Embodiment 32, wherein a tracking area code in the list is associated with a list of one or more RAN area codes.

Example Embodiment 34: The method of Example Embodiment 25, wherein further including in the resume request message an information element indicating that the cause of sending the resume request message is RNAU.

Example Embodiment 35: The method of Example Embodiment 25, wherein the SI request information element comprises a bitmap, each bit of the bitmap associated with a SI message, the value of each bit indicating whether the delivery of the corresponding SI message is requested or not.

Example Embodiment 36: The method of Example Embodiment 25, wherein the n'th bit in the bitmap corresponds to the SI message indicated by the n'th scheduling information included in the first type system information.

Example Embodiment 37: The method of Example Embodiment 25, wherein further receiving a response message after transmitting the resume request message.

Example Embodiment 38: The method of Example Embodiment 37, wherein the response message indicates a positive result (accept) of the RNAU procedure.

Example Embodiment 39: The method of Example Embodiment 37, wherein the response message indicates a negative result (reject) of the RNAU procedure.

Example Embodiment 40: The method of Example Embodiment 37, wherein the response message further includes an acknowledgement of the SI request information element included in the resume request message.

Example Embodiment 41: The method of Example Embodiment 40, wherein the acknowledgement comprises a bitmap, each bit of the bitmap associated with a SI message, the value of each bit whether the corresponding SI message will be transmitted or not.

Example Embodiment 42: The method of Example Embodiment 41, wherein the n'th bit in the bitmap corresponds to the SI message indicated by the n'th scheduling information included in the first type system information.

Example Embodiment 43: The method of Example Embodiment 40, wherein the acknowledgement indicates whether the request of SI messages in the resume request message is accepted or not.

Example Embodiment 44: The method of Example Embodiment 40, wherein further acquiring the requested SI message(s) based on the corresponding scheduling information.

Example Embodiment 45: The method of Example Embodiment 40, wherein assuming that the request of SI messages included in the resume request message is granted in a case of receiving the response message.

Example Embodiment 46: The method of Example Embodiment 40, wherein assuming that the request of SI message(s) included in the resume request message is rejected in a case where the response message does not include the acknowledgement of the information about the requested SI message(s).

Example Embodiment 47: The method of Example Embodiment 25, wherein the message is a resume request message.

Example Embodiment 48: The method of Example Embodiment 25, wherein the message includes an SI request information element.

Example Embodiment 49: An access node of a radio access network (RAN) which communicates over a radio interface with a user equipment, the access node comprising:

transmitter circuitry configured to transmit first type system information (SI), the first type system information comprising:
  availability of second type SI messages, the second type SI messages comprising at least one system information block (SIB);
  scheduling information for each of the SI messages, the scheduling information specifying downlink radio resources to be used for transmitting the respective SI message;
  an indication of a delivery mode for each of the second type SI messages, the delivery mode being either periodic broadcast or on-demand basis;

receiver circuitry configured to receive a message from a user equipment that is configured both to initiate a RAN-based area update (RNAU) procedure and to request transmission of at least one of the SI message; and processor circuitry configured to make a determination whether to transmit at least one of the requested SI message requested by the message; and the transmitter circuitry further configured to transmit the at least one of the requested SI messages based on the corresponding scheduling information.

Example Embodiment 50: The access node of Example Embodiment 49, wherein the first type system information further includes validity information associated with each SIB in the available second type SI messages, the validity information comprising a value tag and a SI area identity.

Example Embodiment 51: The access node of Example Embodiment 49, wherein the access node configures the user equipment with a RAN-based notification area (RNA) configuration in a case where the user equipment transitions to an inactive state.

Example Embodiment 52: The access node of Example Embodiment 49, wherein the first type system information further includes a RAN-based area identity.

Example Embodiment 53: The access node of Example Embodiment 52, wherein the RAN-based area identity is a cell identity and the RAN-based notification area (RNA) configuration comprises a list of cell identities.

Example Embodiment 54: The access node of Example Embodiment 52, wherein the RAN-based area identity is a tracking area code and the RNA configuration comprises a list of tracking area codes.

Example Embodiment 55: The access node of Example Embodiment 54, wherein a tracking area code in the list is associated with a list of one or more RAN area codes.

Example Embodiment 56: The access node of Example Embodiment 49, wherein the SI request information element comprises a bitmap, each bit of the bitmap associated with a SI message, the value of each bit indicating whether the delivery of the corresponding SI message is requested or not.

Example Embodiment 57: The access node of Example Embodiment 56, wherein the n'th bit in the bitmap corresponds to the SI message indicated by the n'th scheduling information included in the first type system information.

Example Embodiment 58: The access node of Example Embodiment 49, wherein the transmitter circuitry is further configured to transmit a response message after receiving the resume request message.

Example Embodiment 59: The access node of Example Embodiment 58, wherein the response message indicates a positive result (accept) of the RNAU procedure.

Example Embodiment 60: The access node of Example Embodiment 58, wherein the response message indicates a negative result (reject) of the RNAU procedure.

Example Embodiment 61: The access node of Example Embodiment 58, wherein the response message further includes an acknowledgement of the SI request information element included in the resume request message.

Example Embodiment 62: The access node of Example Embodiment 61, wherein the acknowledgement comprises a bitmap, each bit of the bitmap associated with a SI message, the value of each bit whether the corresponding SI message will be transmitted or not.

Example Embodiment 63: The access node of Example Embodiment 62, wherein the n'th bit in the bitmap corresponds to the SI message indicated by the n'th scheduling information included in the first type system information.

Example Embodiment 64: The access node of Example Embodiment 61, wherein the acknowledgement indicates whether the request of SI messages in the resume request message is accepted or not.

Example Embodiment 65: The access node of Example Embodiment 49, wherein the message is a resume request message.

Example Embodiment 66: The access node of Example Embodiment 49, wherein the message includes an SI request information element.

Example Embodiment 67: A method in a access node of a radio access network (RAN) communicating over a radio interface with a user equipment comprising:
  transmitting first type system information (SI), the first type system information comprising:
    availability of second type SI messages, a second type SI message comprising at least one system information block (SIB);
    scheduling information of each of the SI messages, the scheduling information specifying downlink radio resources to be used for transmitting the SI message;
    an indication of a delivery mode for each of the second type SI messages, the delivery mode being either periodic broadcast or on-demand basis;
  receiving a message from a user equipment, the message being configured both to initiate a RAN-based area update (RNAU) procedure and to request transmission of at least one SI message;
  making a determination whether to transmit at least one of the SI messages requested by the message; and
  transmitting to the user equipment the at least one SI message based on the corresponding scheduling information.

Example Embodiment 68: The method of Example Embodiment 67, wherein the first type system information further includes validity information associated with each SIB in the available second type SI messages, the validity information comprising a value tag and a SI area identity.

Example Embodiment 69: The method of Example Embodiment 67, wherein configuring the user equipment with a RAN-based notification area (RNA) configuration in a case where the user equipment transitions to an inactive state.

Example Embodiment 70: The method of Example Embodiment 67, wherein the first type system information further includes a RAN-based area identity.

Example Embodiment 71: The method of Example Embodiment 70, wherein the RAN-based area identity is a cell identity and the RAN-based notification area (RNA) configuration comprises a list of cell identities.

Example Embodiment 72: The method of Example Embodiment 70, wherein the RAN-based area identity is a tracking area code and the RNA configuration comprises a list of tracking area codes.

Example Embodiment 73: The method of Example Embodiment 72, wherein a tracking area code in the list is associated with a list of one or more RAN area codes.

Example Embodiment 74: The method of Example Embodiment 67, wherein the SI request information element comprises a bitmap, each bit of the bitmap associated with a SI message, the value of each bit indicating whether the delivery of the corresponding SI message is requested or not.

Example Embodiment 75: The method of Example Embodiment 74, wherein the n'th bit in the bitmap corresponds to the SI message indicated by the n'th scheduling information included in the first type system information.

Example Embodiment 76: The method of Example Embodiment 67, wherein the transmitter circuitry is further configured to transmit a response message after receiving the resume request message.

Example Embodiment 77: The method of Example Embodiment 76, wherein the response message indicates a positive result (accept) of the RNAU procedure.

Example Embodiment 78: The method of Example Embodiment 76, wherein the response message indicates a negative result (reject) of the RNAU procedure.

Example Embodiment 79: The method of Example Embodiment 76, wherein the response message further includes an acknowledgement of the SI request information element included in the resume request message.

Example Embodiment 80: The method of Example Embodiment 79, wherein the acknowledgement comprises a bitmap, each bit of the bitmap associated with a SI message, the value of each bit whether the corresponding SI message will be transmitted or not.

Example Embodiment 81: The method of Example Embodiment 80, wherein the n'th bit in the bitmap corresponds to the SI message indicated by the n'th scheduling information included in the first type system information.

Example Embodiment 82: The method of Example Embodiment 79, wherein the acknowledgement indicates whether the request of SI messages in the resume request message is accepted or not.

Example Embodiment 83: The method of Example Embodiment 67, wherein the message is a resume request message.

Example Embodiment 84: The method of Example Embodiment 67 wherein the message includes an SI request information element.

Example Embodiment 85: A user equipment that communicates over a radio interface with an access node of a radio access network (RAN), the user equipment comprising:
  receiver circuitry configured to receive first type system information (SI) from the access node, the first type system information comprising:
    scheduling information specifying downlink radio resources for second type SI message(s), each of the second type SI message(s) comprising at least one system information block (SIB);
    an indication of a delivery mode for each of the second type SI message(s), the delivery mode being either periodic broadcast or on-demand basis;
  processor circuitry configured to generate, in a case that the user equipment is in an inactive state, a request message for both initiating a RAN-based area update (RNAU) procedure and requesting transmission of at least one second type SI message, and;
  transmitter circuitry configured to transmit the request message.

Example Embodiment 86: The user equipment of Example Embodiment 85, wherein the request message is generated in a case that at least one SIB stored in the user equipment is invalid and the delivery mode for a corresponding second type SI message is on-demand basis.

Example Embodiment 87: The user equipment of Example Embodiment 85, wherein the request message is generated in a case that a RAN-based area identity is not included in a configuration used to define a RAN-based notification area (RNA).

Example Embodiment 88: The user equipment of Example Embodiment 87, wherein the RAN-based area identity is included in the first type SI, and the configuration used to define the RNA is configured upon entering the inactive state.

Example Embodiment 89: The user equipment of Example Embodiment 85, wherein the request message comprises a bitmap, each bit of the bitmap indicating whether or not transmission of a corresponding SI message is requested.

Example Embodiment 90: A method in a user equipment communicating over a radio interface with an access node of a radio access network (RAN) comprising:
receiving first type system information (SI) from the access node, the first type system information comprising:
scheduling information specifying downlink radio resources for second type SI message(s), each of the second type SI message(s) comprising at least one system information block (SIB);
an indication of a delivery mode for each of the second type SI message(s), the delivery mode being either periodic broadcast or on-demand basis;
generating, in a case that the user equipment is in an inactive state, a request message for both initiating a RAN-based area update (RNAU) procedure and requesting transmission of at least one second type SI message; and
transmitting the request message.

Example Embodiment 91: The method of Example Embodiment 90, wherein the request message is generated in a case that at least one SIB stored in the user equipment is invalid and the delivery mode for a corresponding second type SI message is on-demand basis.

Example Embodiment 92: The method of Example Embodiment 90, wherein the request message is generated in a case that a RAN-based area identity is not included in a configuration used to define a RAN-based notification area (RNA).

Example Embodiment 93: The method of Example Embodiment 92, wherein the RAN-based area identity is included in the first type SI, and the configuration used to define the RNA is configured upon entering the inactive state.

Example Embodiment 94: The method of Example Embodiment 90, wherein the request message comprises a bitmap, each bit of the bitmap indicating whether or not transmission of a corresponding SI message is requested.

Example Embodiment 95: An access node of a radio access network (RAN) which communicates over a radio interface with a user equipment, the access node comprising:
transmitter circuitry configured to transmit first type system information (SI), the first type system information comprising:
scheduling information specifying downlink radio resources for second type SI message(s), each of the second type SI message(s) comprising at least one system information block (SIB);
an indication of a delivery mode for each of the second type SI message(s), the delivery mode being either periodic broadcast or on-demand basis;
receiver circuitry configured to receive a request message for both initiating a RAN-based area update (RNAU) procedure and requesting transmission of at least one of the second type SI message(s); and
processor circuitry configured to generate at least one of the requested second type SI message(s); and
the transmitter circuitry further configured to transmit the at least one of the requested second type SI message(s), wherein;
the request message is received in a case that the user equipment is in an inactive state.

Example Embodiment 96: The access node of Example Embodiment 95, wherein the request message is received in a case that at least one SIB stored in the user equipment is invalid and the delivery mode for a corresponding second type SI message is on-demand basis.

Example Embodiment 97: The access node of Example Embodiment 95, wherein the request message is generated in a case that a RAN-based area identity is not included in a configuration used to define a RAN-based notification area (RNA).

Example Embodiment 98: The access node of Example Embodiment 97, wherein the RAN-based area identity is included in the first type SI, and the configuration used to define the RNA is configured to the user equipment upon or before the user equipment entering the inactive state.

Example Embodiment 99: The access node of Example Embodiment 95, wherein the request message comprises a bitmap, each bit of the bitmap indicating whether or not transmission of a corresponding SI message is requested.

Example Embodiment 100: A method in an access node of a radio access network (RAN) communicating over a radio interface with a user equipment comprising:
transmitting first type system information (SI), the first type system information comprising:
scheduling information specifying downlink radio resources for second type SI message(s), each of the second type SI message(s) comprising at least one system information block (SIB);
an indication of a delivery mode for each of the second type SI message(s), the delivery mode being either periodic broadcast or on-demand basis;
receiving a request message for both initiating a RAN-based area update (RNAU) procedure and requesting transmission of at least one second type SI message;
generating at least one of the requested second type SI message(s); and
transmitting the at least one of the requested second type SI message(s), wherein;
the request message is received in a case that the user equipment is in an inactive state.

Example Embodiment 101: The method of Example Embodiment 100, wherein the request message is received in a case that at least one SIB stored in the user equipment is invalid and the delivery mode for a corresponding second type SI message is on-demand basis.

Example Embodiment 102: The method of Example Embodiment 100, wherein the request message is generated in a case that a RAN-based area identity is not included in a configuration used to define a RAN-based notification area (RNA).

Example Embodiment 103: The method of Example Embodiment 102, wherein the RAN-based area identity is included in the first type SI, and the configuration used to define the RNA is configured to the user equipment upon or before the user equipment entering the inactive state.

Example Embodiment 104: The method of Example Embodiment 100, wherein the request message comprises a bitmap, each bit of the bitmap indicating whether or not transmission of a corresponding SI message is requested.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A user equipment that communicates over a radio interface with an access node of a radio access network (RAN), the user equipment comprising:
   receiver circuitry configured to receive first type system information (SI) from the access node, the first type system information comprising:
      scheduling information specifying downlink radio resources for second type SI message(s), each of the second type SI message(s) comprising at least one system information block (SIB);
      an indication of a delivery mode for each of the second type SI message(s), the delivery mode being either periodic broadcast or on-demand basis;
   transmitter circuitry configured to transmit, in a case that the user equipment is in an inactive state, a request message comprising:
      a request of a RAN-based area update (RNAU); and,
      a request of transmission of at least one second type SI message;
   the receiver circuitry further configured to receive, from the access node in response to the request message, a response message indicating whether or not the request of transmission of the at least one second type SI message is accepted; and,
   processor circuitry configured to initiate, in a case that the response message indicates that the request of transmission of the at least one second type SI message is accepted, an acquisition procedure to acquire the at least one second type SI message based on the scheduling information.

2. The user equipment of claim 1, wherein the request message is generated in a case that at least one SIB stored in the user equipment is invalid and the delivery mode for a corresponding second type SI message is on-demand basis.

3. The user equipment of claim 1, wherein the request message is generated in a case that a RAN-based area identity is not included in a configuration used to define a RAN-based notification area (RNA).

4. The user equipment of claim 3, wherein the RAN-based area identity is included in the first type SI, and the configuration used to define the RNA is configured upon or before entering the inactive state.

5. The user equipment of claim 1, wherein the request message comprises a bitmap, each bit of the bitmap indicating whether or not transmission of a corresponding SI message is requested.

6. A method in a user equipment communicating over a radio interface with an access node of a radio access network (RAN) comprising;
    receiving first type system information (SI) from the access node, the first type system information comprising:
        scheduling information specifying downlink radio resources for second type SI message(s), each of the second type SI message(s) comprising at least one system information block (SIB);
        an indication of a delivery mode for each of the second type SI message(s), the delivery mode being either periodic broadcast or on-demand basis;
    transmitting, in a case that the user equipment is in an inactive state, a request message comprising:
        a request of a RAN-based area update (RNAU); and
        a request of transmission of at least one second type SI message;
    receiving, from the access node, in response to the request message, a response message indicating whether or not the request of transmission of the at least one second type SI message is accepted; and
    initiating, in a case that the response message indicates that the request of transmission of the at least one second type SI message is accepted, an acquisition procedure to acquire, the at least one second type SI message based on scheduling information.

7. The method of claim 6, wherein the request message is generated in a case that at least one SIB stored in the user equipment is invalid and the delivery mode for a corresponding second type SI message is on-demand basis.

8. The method of claim 6, wherein the request message is generated in a case that a RAN-based area identity is not included in a configuration used to define a RAN-based notification area (RNA).

9. The method of claim 8, wherein the RAN-based area identity is included in the first type SI, and the configuration used to define the RNA is configured upon or before entering the inactive state.

10. The method of claim 6, wherein the request message comprises a bitmap, each bit of the bitmap indicating whether or not transmission of a corresponding SI message is requested.

11. An access node of a radio access network (RAN) which communicates over a radio interface with a user equipment, the access node comprising:
    transmitter circuitry configured to transmit first type system information (SI), the first type system information comprising:
        scheduling information specifying downlink radio resources for second type SI message(s), each of the second type SI message(s) comprising at least one system information block (SIB);
        an indication of a delivery mode for each of the second type SI message(s), the delivery mode being either periodic broadcast or on-demand basis;
    receiver circuitry configured to receive a request message comprising:
        a request of a RAN-based area update (RNAU); and
        a request of transmission of at least one second type SI message;
    the transmitter circuitry further configured:
        to transmit, in response to the request message, a response message indicating whether or not the request of transmission of the at least one second type SI message is accepted, and
        to transmit, in a case that the response message indicates that the request of transmission of the at least one second type SI message is accepted, the at least one second type SI message(s) based on the scheduling information.

12. The access node of claim 11, wherein the request message is received in a case that at least one SIB stored in the user equipment is invalid and the delivery mode for a corresponding second type SI message is on-demand basis.

13. The access node of claim 11, wherein the request message is generated in a case that a RAN-based area identity is not included in a configuration used to define a RAN-based notification area (RNA).

14. The access node of claim 13, wherein the RAN-based area identity is included in the first type SI, and the configuration used to define the RNA is configured to the user equipment upon or before the user equipment entering the inactive state.

15. The access node of claim 11, wherein the request message comprises a bitmap, each bit of the bitmap indicating whether or not transmission of a corresponding SI message is requested.

16. A method in an access node of a radio access network (RAN) communicating over a radio interface with a user equipment comprising:
    transmitting first type system information (SI), the first type system information comprising:
        scheduling information specifying downlink radio resources for second type SI message(s), each of the second type SI message(s) comprising at least one system information block (SIB);
        an indication of a delivery mode for each of the second type SI message(s), the delivery mode being either periodic broadcast or on-demand basis;
    receiving a request message comprising:
        a request of a RAN-based area update (RNAU); and
        a request of transmission of at least one second type SI message;
    transmitting, in response to the request message, a response message indicating whether or not the request of transmission of the at least one second type SI is accepted; and
    transmitting, in a case that the response message indicates that the request of transmission of the at least one second type SI message is accepted, the at least one second type SI message based on the scheduling information.

17. The method of claim 16, wherein the request message is received in a case that at least one SIB stored in the user equipment is invalid and the delivery mode for a corresponding second type SI message is on-demand basis.

18. The method of claim 16, wherein the request message is generated in a case that a RAN-based area identity is not included in a configuration used to define a RAN-based notification area (RNA).

19. The method of claim 18, wherein the RAN-based area identity is included in the first type SI, and the configuration used to define the RNA is configured to the user equipment upon or before the user equipment entering the inactive state.

20. The method of claim 16, wherein the request message comprises a bitmap, each bit of the bitmap indicating whether or not transmission of a corresponding SI message is requested.

* * * * *

UNITED STATES PATENT AND TRADEMARK OFFICE
CERTIFICATE OF CORRECTION

PATENT NO. : 11,212,784 B2  
APPLICATION NO. : 16/372648  
DATED : December 28, 2021  
INVENTOR(S) : Atsushi Ishii Page 1 of 1

It is certified that error appears in the above-identified patent and that said Letters Patent is hereby corrected as shown below:

In the Specification

Column 8, Line 4, "Other SI handler 540" should read --Other SI handler 54O--

Column 9, Line 45, "SIBS" should read --SIBs--

In the Claims

Claim 11, Column 32, Line 11, "circuity" should read --circuitry--

Signed and Sealed this  
Seventh Day of March, 2023

Katherine Kelly Vidal  
*Director of the United States Patent and Trademark Office*